Figure 1:
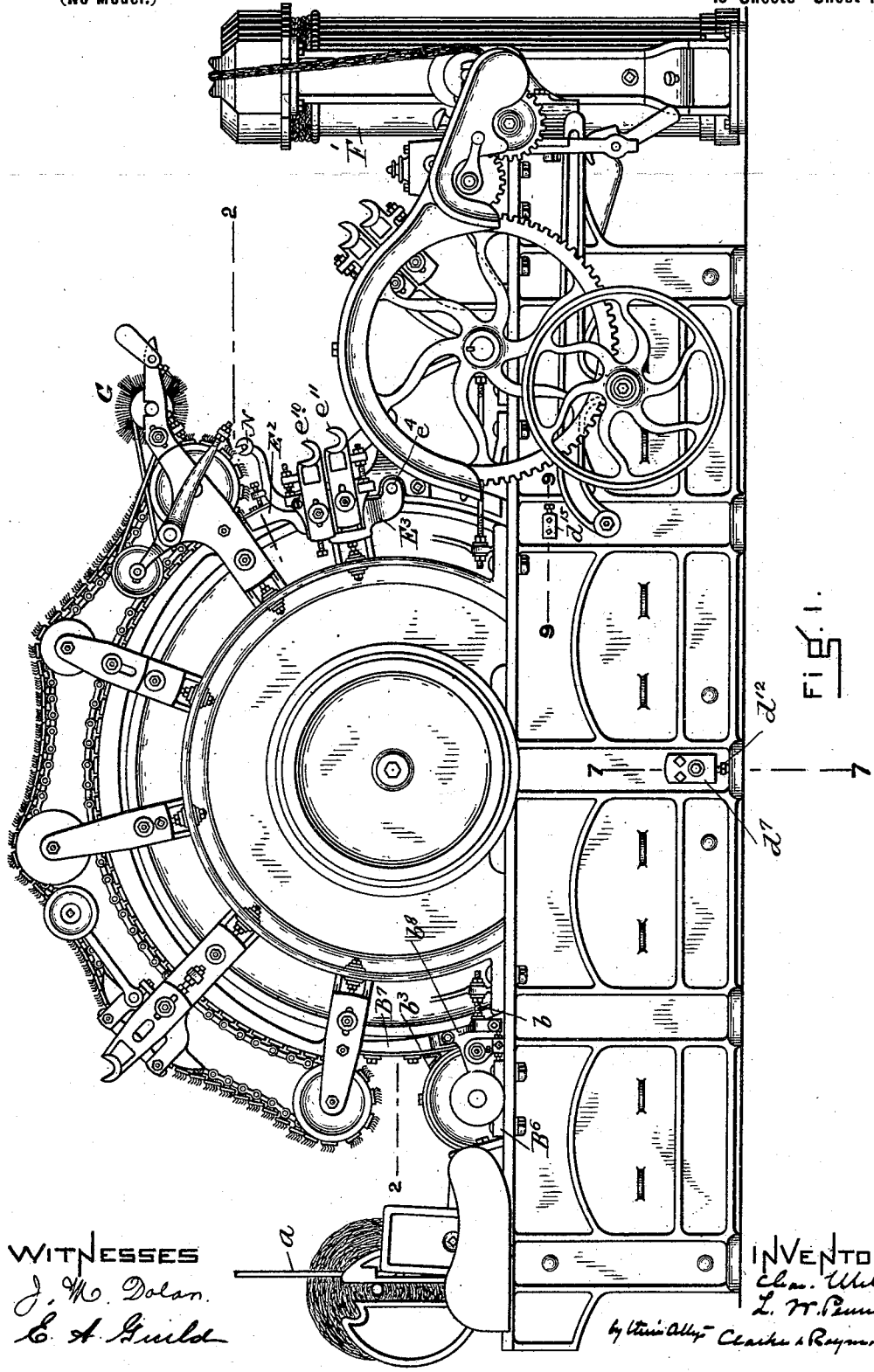

No. 623,094. Patented Apr. 11, 1899.
C. MILLS & L. W. PENNEY.
CARDING ENGINE.
(Application filed Jan. 22, 1896.)
(No Model.) 19 Sheets—Sheet 1.

WITNESSES
J. M. Dolan.
E. A. Guild

INVENTORS
Chas. Mills
L. W. Penney
by their Atty Clarke & Raymond

No. 623,094. Patented Apr. 11, 1899.
C. MILLS & L. W. PENNEY.
CARDING ENGINE.
(Application filed Jan. 22, 1896.)
(No Model.) 19 Sheets—Sheet 3.

No. 623,094. Patented Apr. 11, 1899.
C. MILLS & L. W. PENNEY.
CARDING ENGINE.
(Application filed Jan. 22, 1896.)
(No Model.) 19 Sheets—Sheet 4.

No. 623,094. Patented Apr. 11, 1899.
C. MILLS & L. W. PENNEY.
CARDING ENGINE.
(Application filed Jan. 22, 1896.)
(No Model.) 19 Sheets—Sheet 6.

WITNESSES
J. M. Dolan.
E. A. Guild

INVENTORS
Chas. Mills
L. W. Penney
by their attys
Clarke & Raymond

No. 623,094. Patented Apr. 11, 1899.
C. MILLS & L. W. PENNEY.
CARDING ENGINE.
(Application filed Jan. 22, 1896.)
(No Model.) 19 Sheets—Sheet 7.

No. 623,094. Patented Apr. 11, 1899.
C. MILLS & L. W. PENNEY.
CARDING ENGINE.
(Application filed Jan. 22, 1896.)
(No Model.) 19 Sheets—Sheet 8.
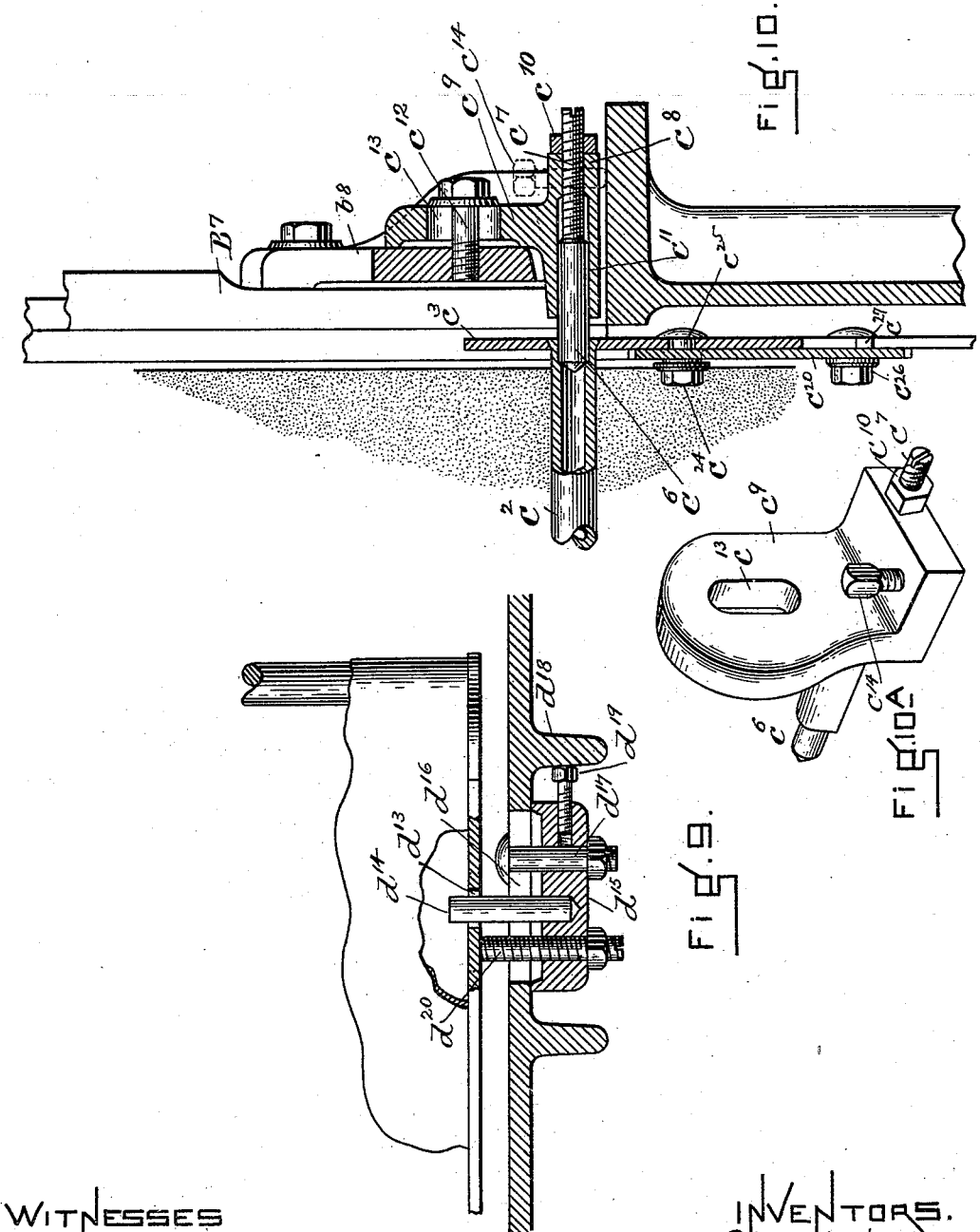

No. 623,094. Patented Apr. 11, 1899.
C. MILLS & L. W. PENNEY.
CARDING ENGINE.
(Application filed Jan. 22, 1896.)
(No Model.) 19 Sheets—Sheet 9.
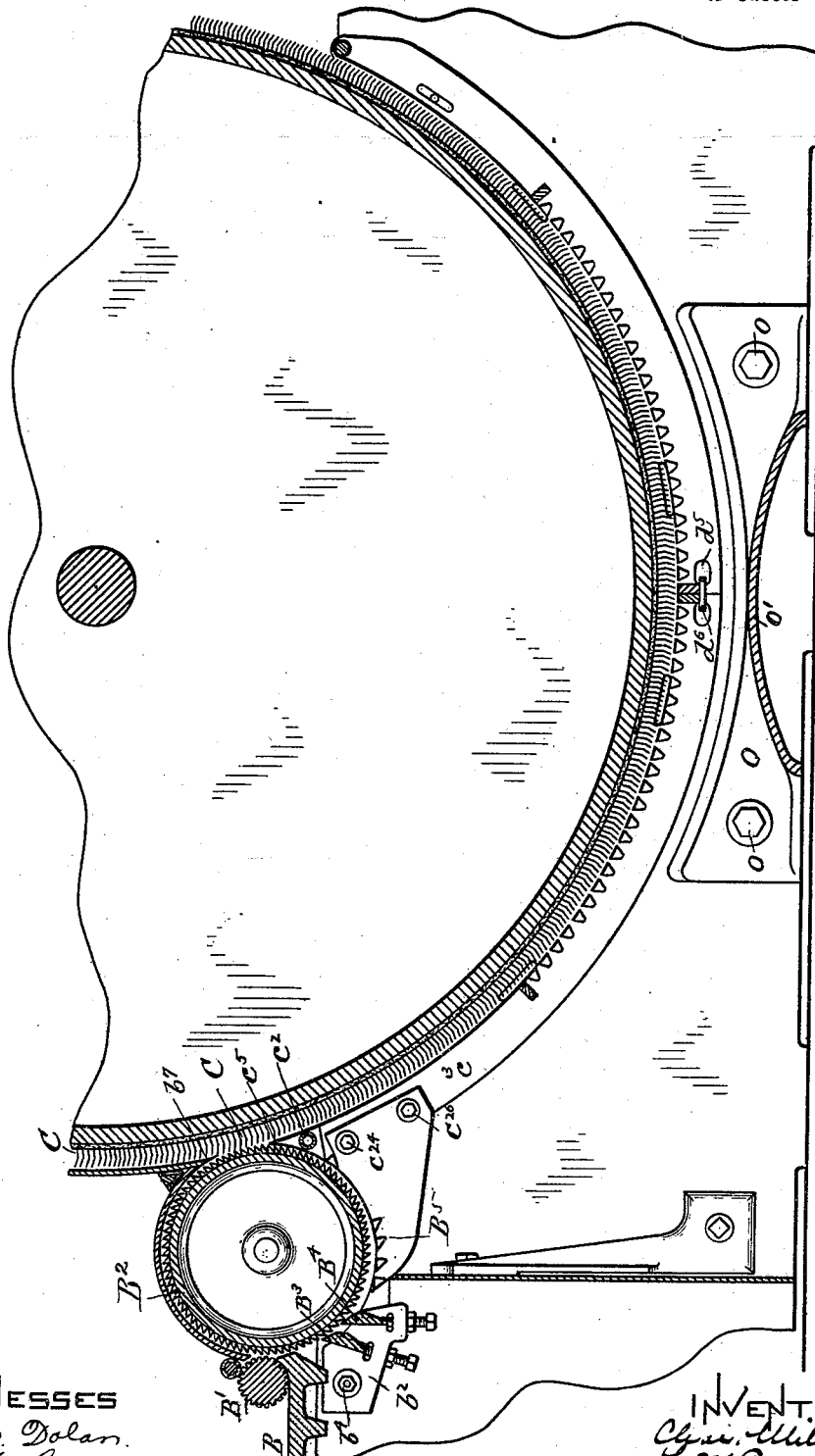

No. 623,094. Patented Apr. 11, 1899.
C. MILLS & L. W. PENNEY.
CARDING ENGINE.
(Application filed Jan. 22, 1896.)
(No Model.) 19 Sheets—Sheet 10.
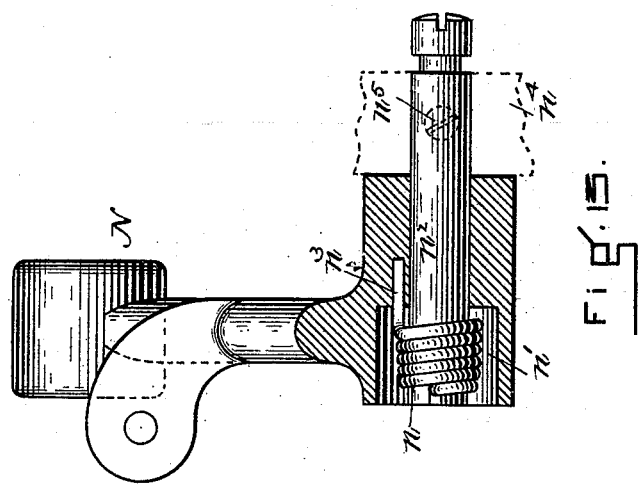
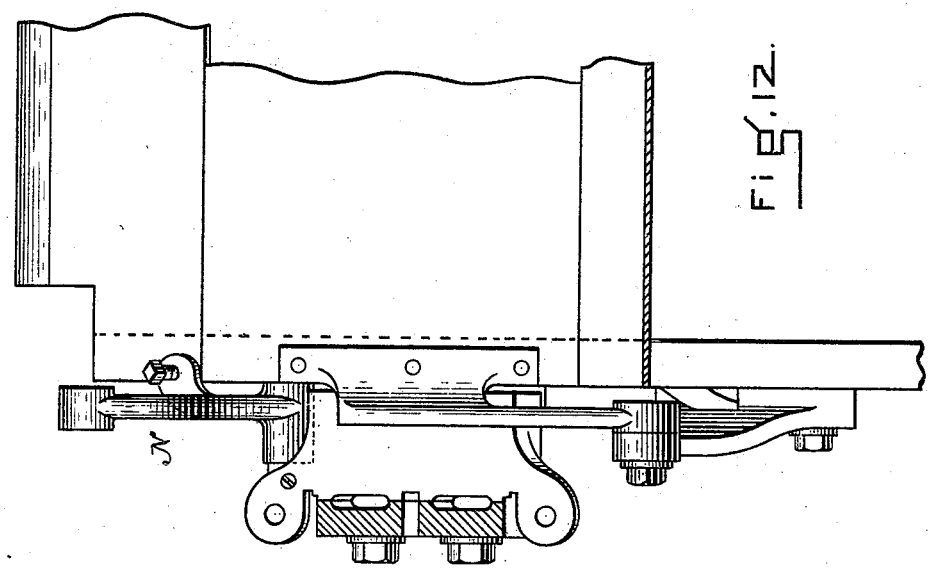
WITNESSES.
J. M. Dolan.
E. H. Guild.
INVENTORS
Chas. Mills
L. W. Penney
by their attys
Clarke & Raymond No. 623,094. Patented Apr. 11, 1899.
C. MILLS & L. W. PENNEY.
CARDING ENGINE.
(Application filed Jan. 22, 1896.)
(No Model.) 19 Sheets—Sheet 11.

Witnesses
J. M. Dolan.
E. A. Guild.

Inventors
Chas. Mills
L. W. Penney
by their atty
Clarke Raymond

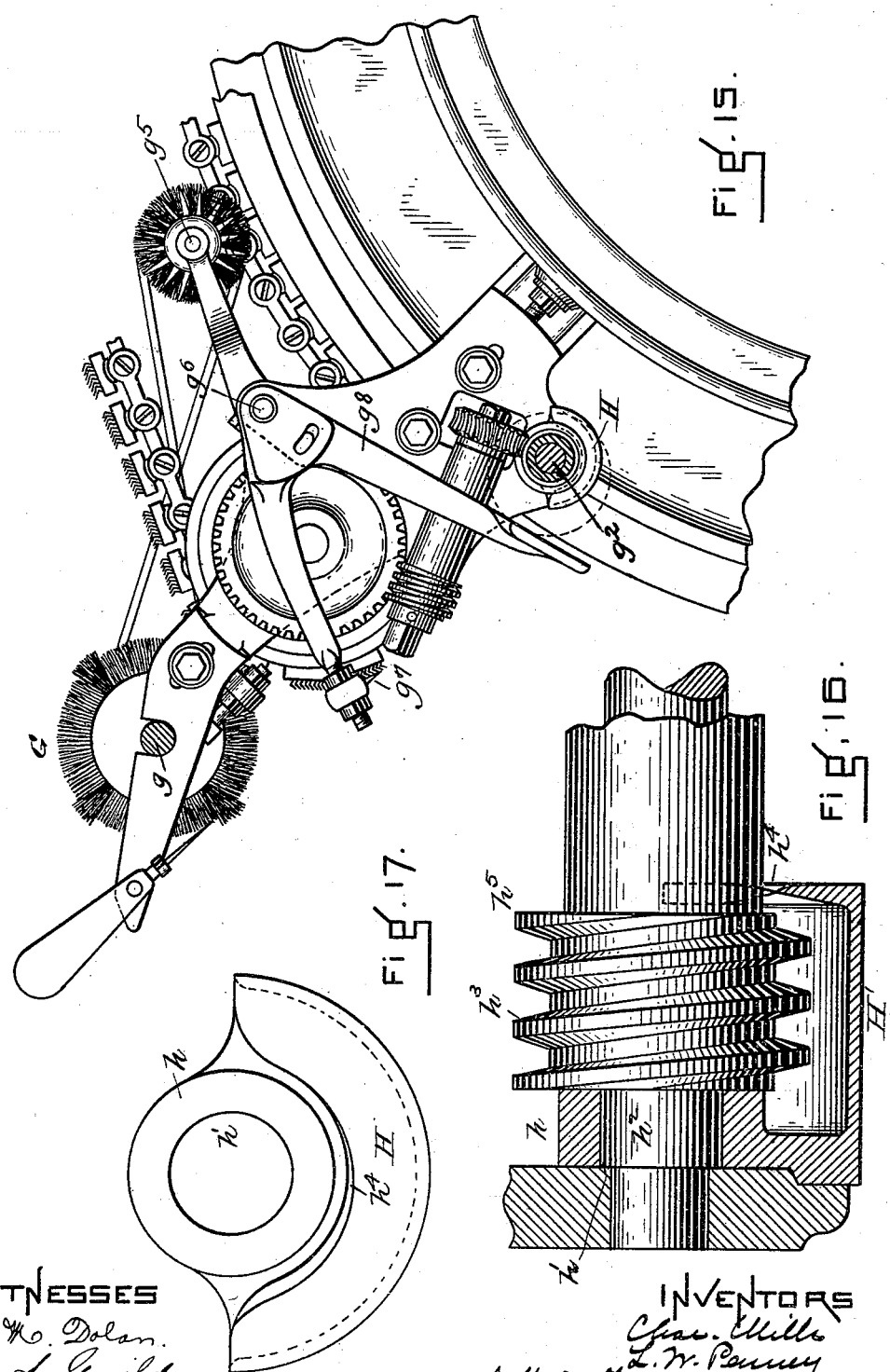

No. 623,094. Patented Apr. 11, 1899.
C. MILLS & L. W. PENNEY.
CARDING ENGINE.
(Application filed Jan. 22, 1896.)
(No Model.) 19 Sheets—Sheet 13.

WITNESSES
J. M. Dolan.
E. A. Guild.

INVENTORS
Chas. Mills
L. W. Penney
by their Atty Charles Raymond

No. 623,094. Patented Apr. 11, 1899.
C. MILLS & L. W. PENNEY.
CARDING ENGINE.
(Application filed Jan. 22, 1896.)
(No Model.) 19 Sheets—Sheet 14.

WITNESSES.
INVENTORS

No. 623,094. Patented Apr. 11, 1899.
C. MILLS & L. W. PENNEY.
CARDING ENGINE.
(Application filed Jan. 22, 1896.)
(No Model.) 19 Sheets—Sheet 15.
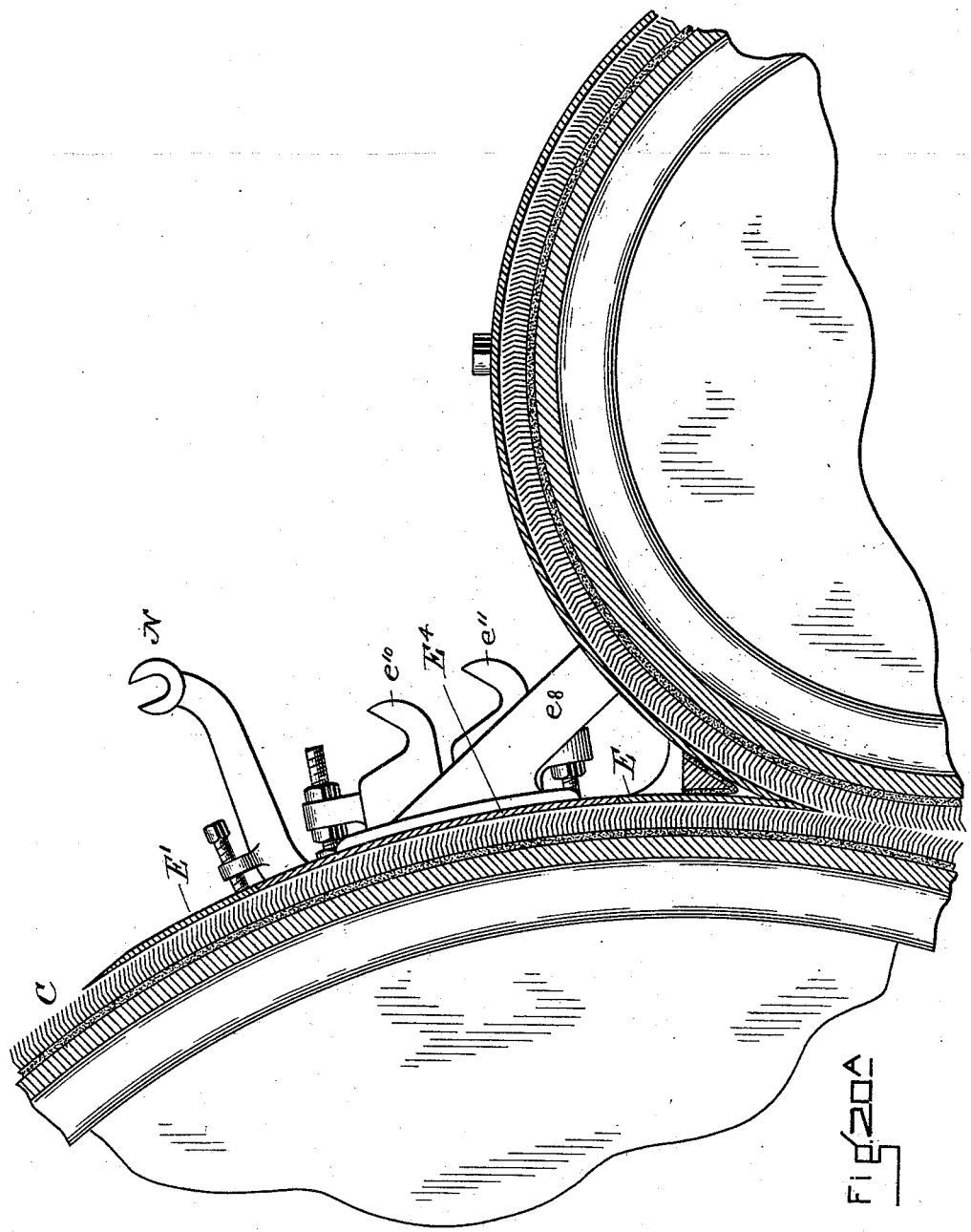
Witnesses.
J. M. Dolan.
E. A. Guild.
Inventors
Chas. Mills
L. W. Penney
by their Atty
Clarke & Raymond

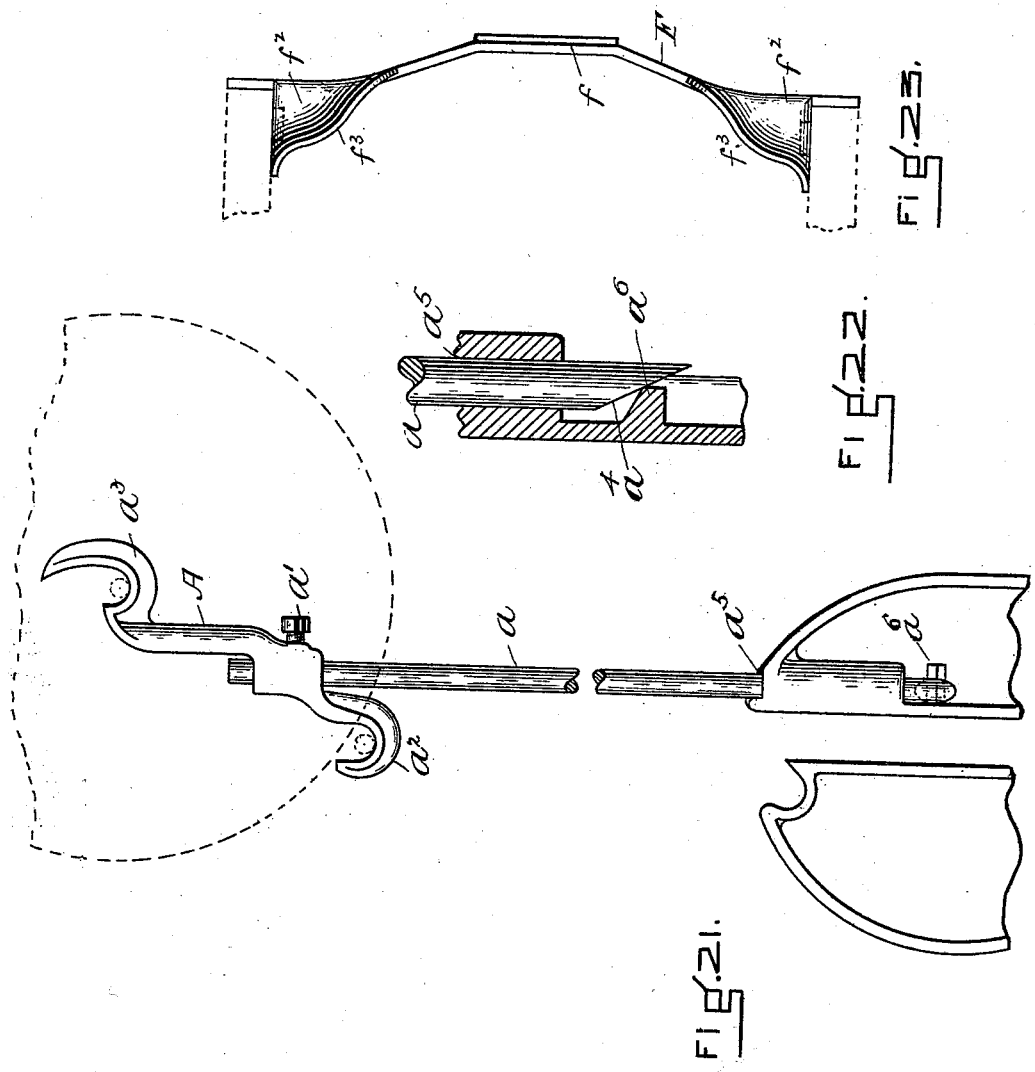

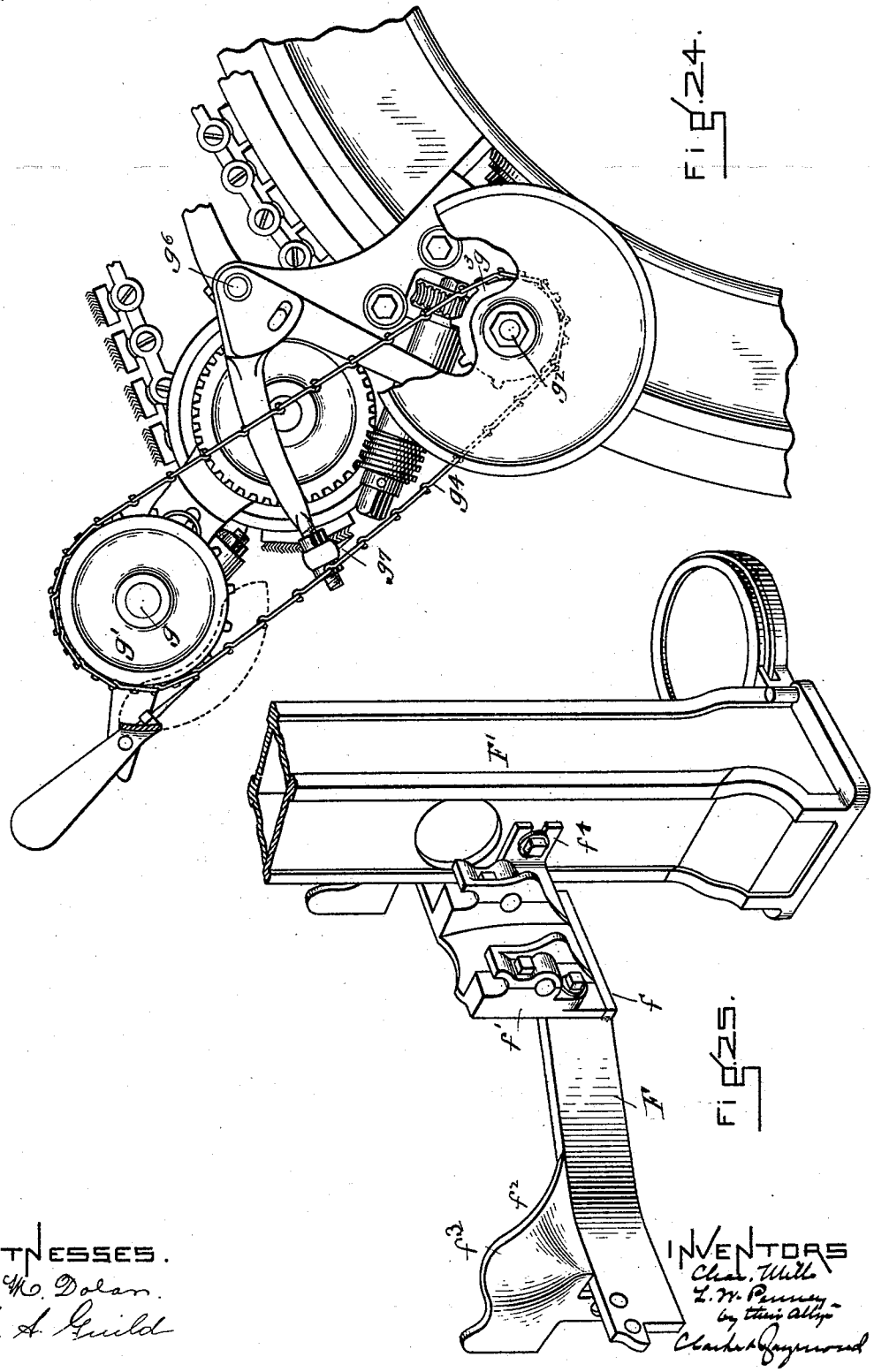

No. 623,094. Patented Apr. 11, 1899.
C. MILLS & L. W. PENNEY.
CARDING ENGINE.
(Application filed Jan. 22, 1896.)

(No Model.) 19 Sheets—Sheet 18.

WITNESSES.
E. A. Guild
J. M. Dolan.

INVENTORS
Chas. Mills
L. W. Penney
by their Atty
Clarke & Raymond

THE NORRIS PETERS CO., PHOTO-LITHO., WASHINGTON, D. C.

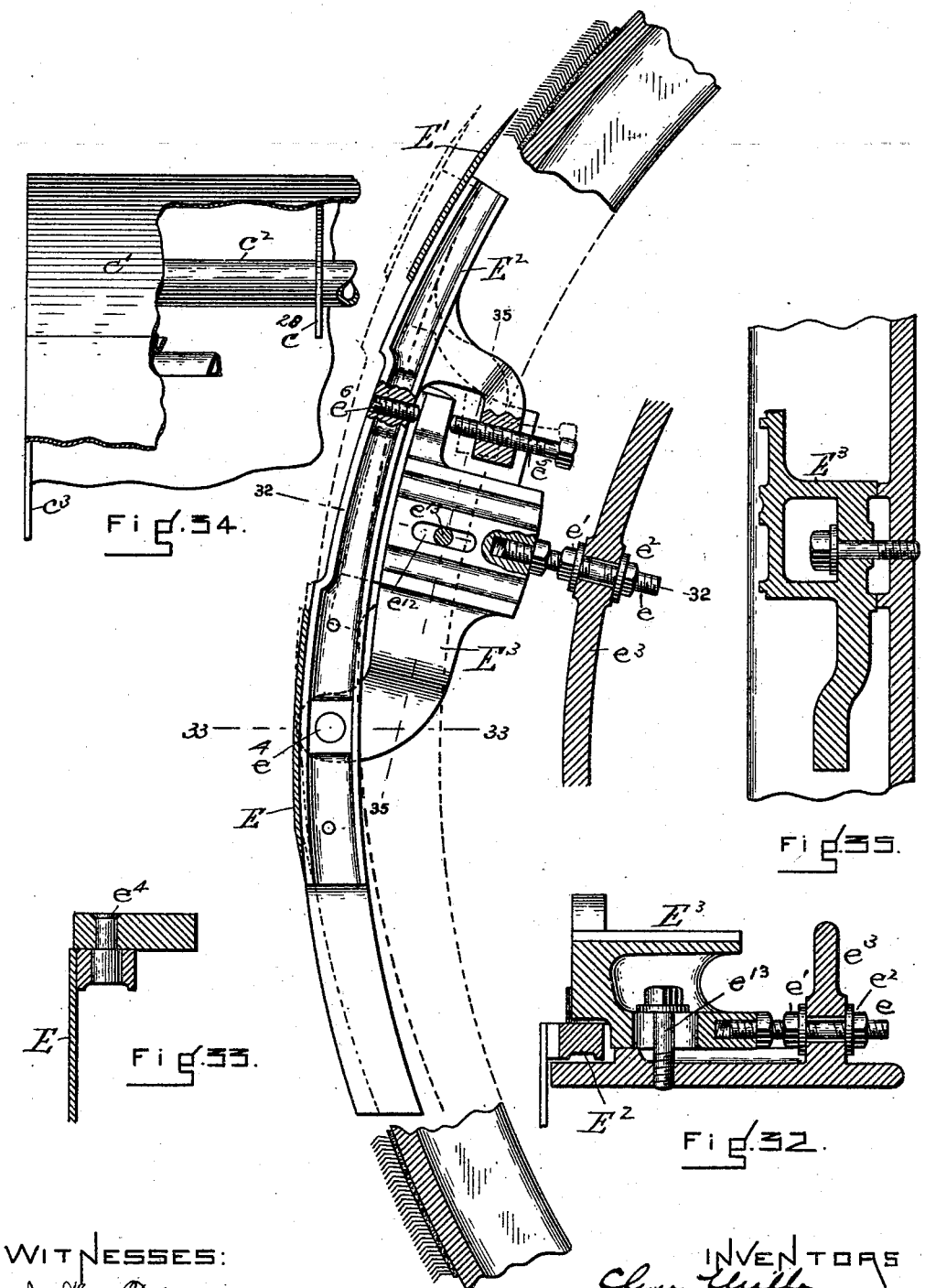

UNITED STATES PATENT OFFICE.

CHARLES MILLS AND LOREN W. PENNEY, OF NEWTON, MASSACHUSETTS, ASSIGNORS TO THE PETTEE MACHINE WORKS, OF SAME PLACE.

CARDING-ENGINE.

SPECIFICATION forming part of Letters Patent No. 623,094, dated April 11, 1899.

Application filed January 22, 1896. Serial No. 576,396. (No model.)

*To all whom it may concern:*

Be it known that we, CHARLES MILLS, a subject of Victoria, Queen of Great Britain, and LOREN W. PENNEY, a citizen of the United States, both residing at Newton, in the county of Middlesex and State of Massachusetts, have invented a new and useful Improvement in Carding-Engines, of which the following is a full, clear, and exact description, reference being had to the accompanying drawings, forming a part of this specification, in explaining its nature.

The invention belongs to the type of carding-engines known as "revolving-flat" carding-engines. Such machines have a main carding-cylinder which is covered with wire clothing, a superposed endless chain of wire-clothed flats, and devices to coöperate with these instrumentalities in feeding the lap thereto and removing it therefrom, consisting of a licker-in roll, doffer, mote-knives, make-up pieces, and screens.

Such is the nature of the machine and the material which it works upon, that the various parts above named must be very accurately made and finely adjusted to each other to obtain the best results, and any slight variations from the condition thus established seriously interfere with the successful operation of the machine. Variations in the desired relations of these parts may occur in setting up the machine and in use. In setting up the machine, from inability to accurately adjust the parts in relation to each other, and in use, from the reduction of the diameter of the main carding-cylinder by wear and by the grinding of the wire clothing of the carding-cylinder and the carding-flats. These variations, while relatively small, are of enough consequence to make a great difference in the successful operation of the machine, and it has therefore been found necessary to provide these various instrumentalities for cleansing the lap, for feeding it to the carding-cylinder, and for removing it from the carding-cylinder with fine adjustments in relation to the carding-cylinder and in relation in some instances to each other, whereby a desired relation or condition of the parts to each other may be ascertained and arrived at, in the first instance, in the erecting and first adjustment of the machine, which may afterward be maintained. Heretofore these adjustments have been to a very considerable extent individual to each part or piece requiring adjustment, and one important part of our invention consists in the improvement in the means for making these adjustments, whereby the parts as far as practicable are assembled or adjusted together in groups, the various parts of each group being adjustable in relation to each other to permit the requisite first setting of all the parts in respect to each other and to the carding-cylinder, and which groups having thus been set are thereafter made adjustable as a single organization or by a single adjustment in relation to the carding-cylinder— that is, the parts are attached together and combined after their first adjustment to be simultaneously adjusted in relation to the carding-cylinder, thus insuring a continuance of the first and accurate setting of the parts in relation to each other and to the carding-cylinder in all the subsequent stages of the adjustments. The value of this improvement comes from the saving in time which is made, first, in the original setting up of the machine, and, second, in making subsequent adjustments.

The invention further relates to various other improvements, all of which will hereinafter be fully described.

Figure 2:
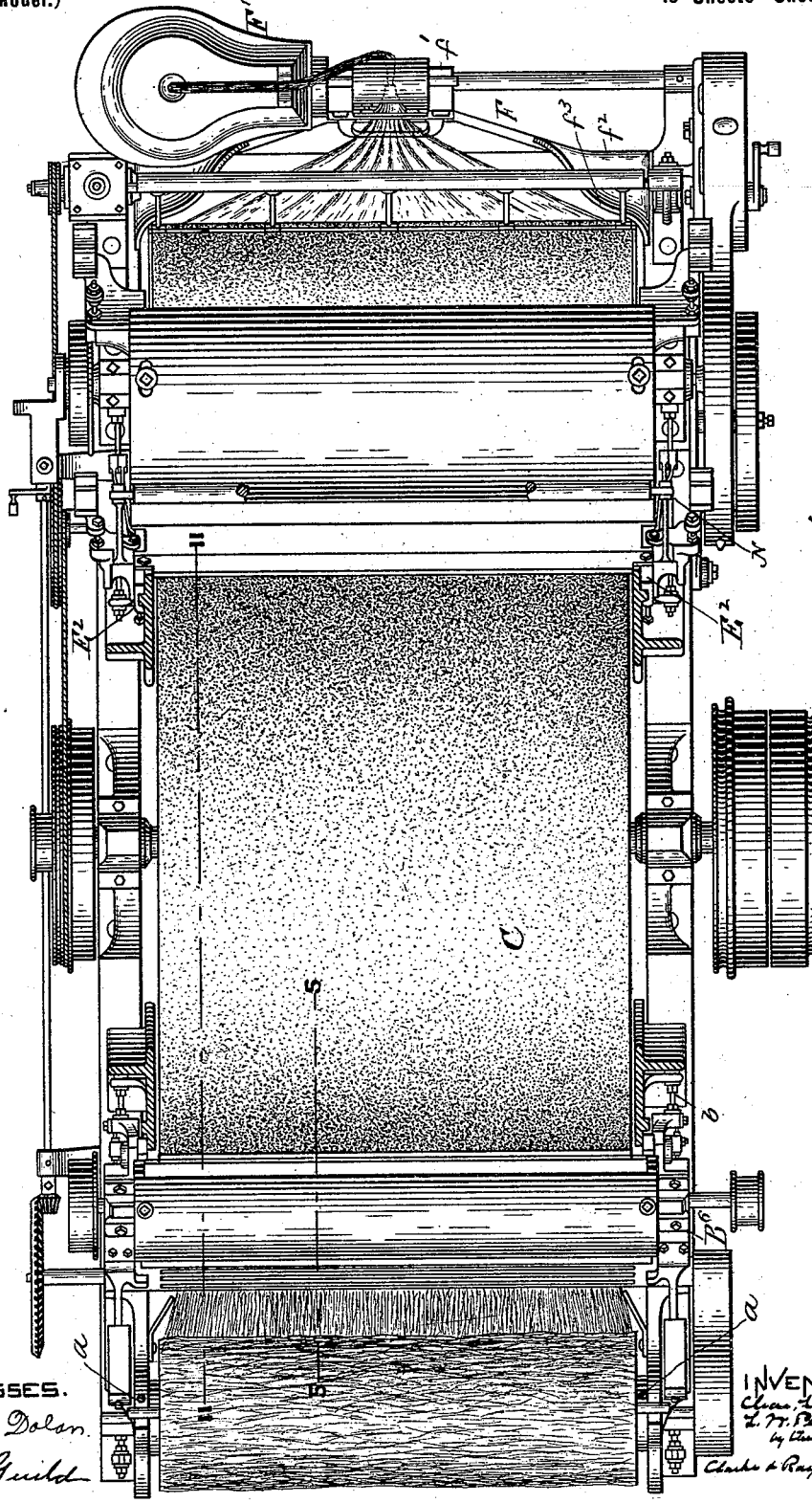
Figure 3:
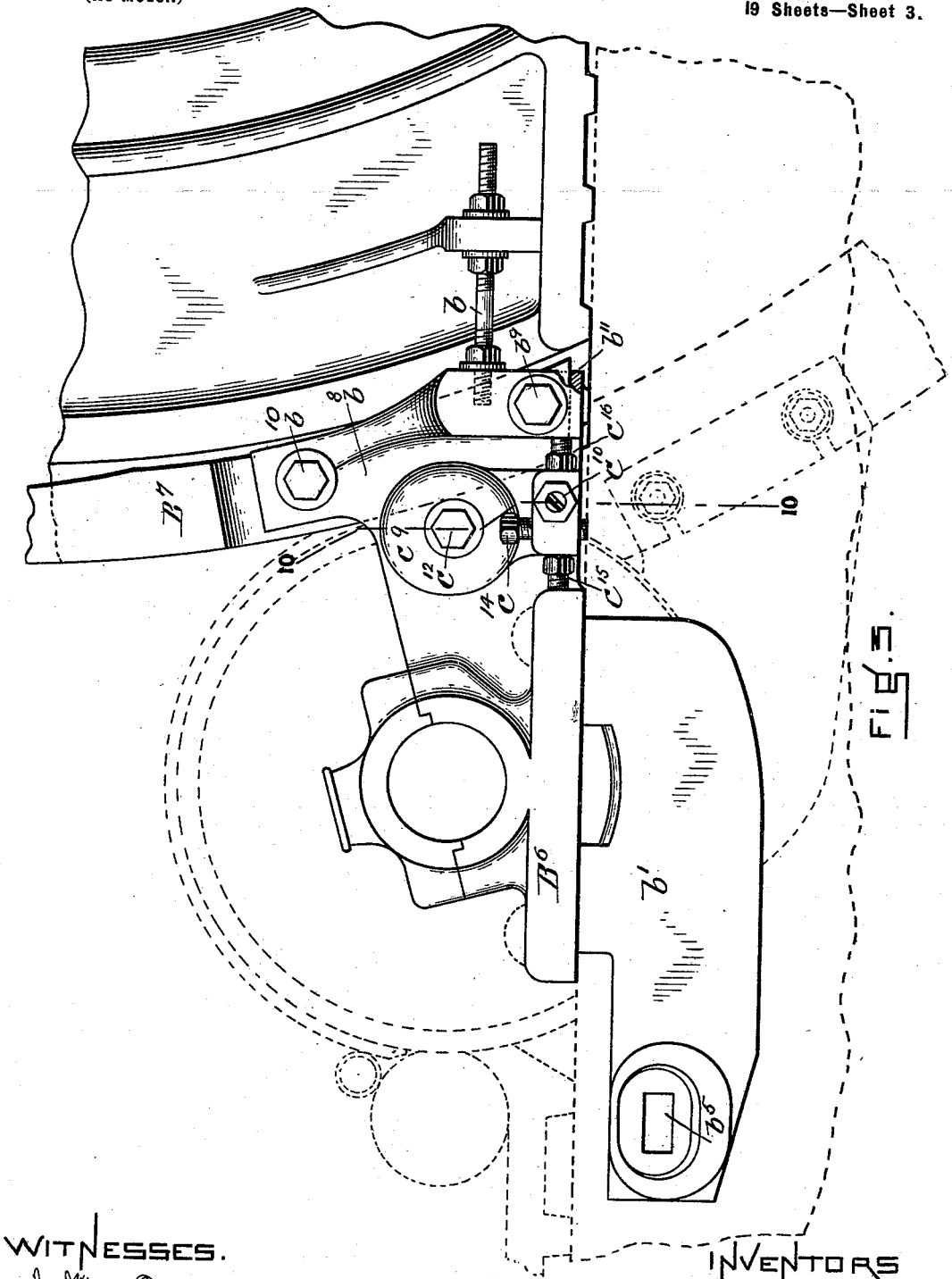
Figure 4:
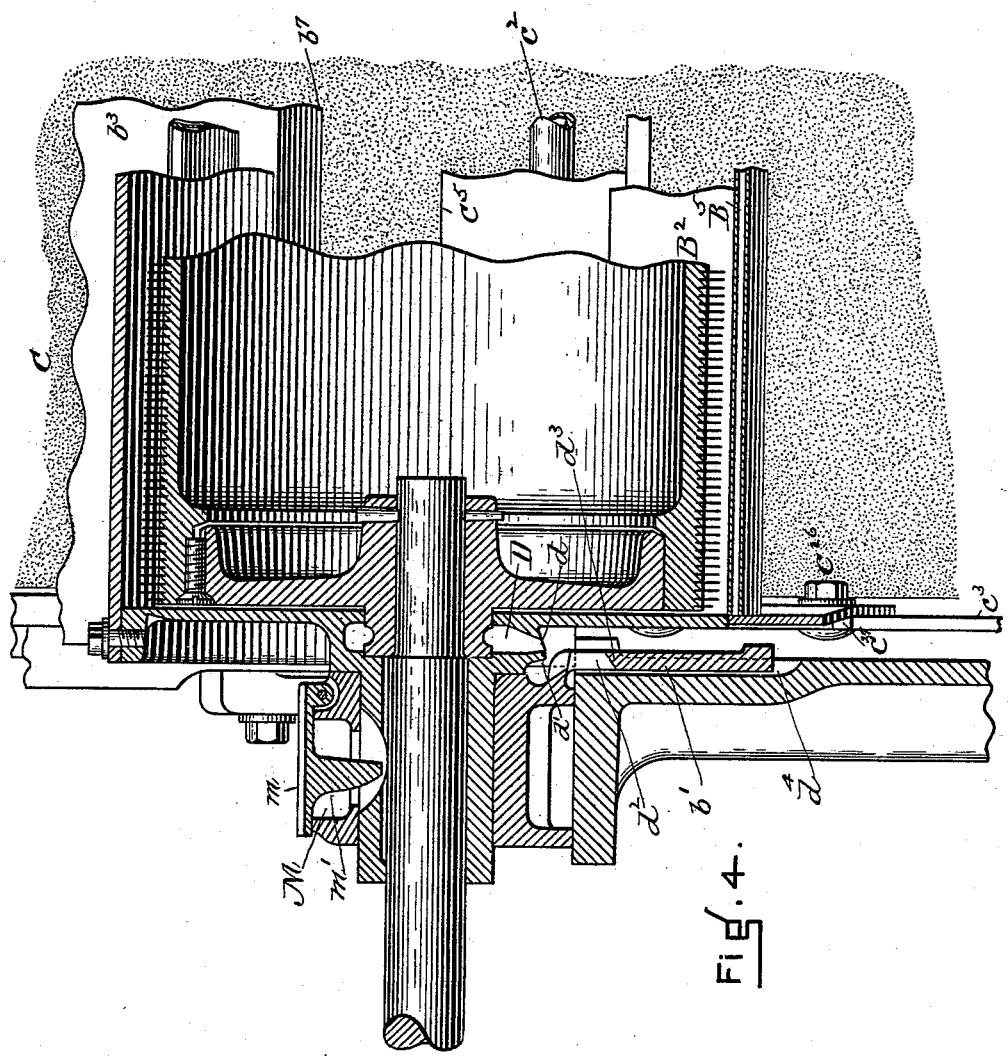
Figure 5:
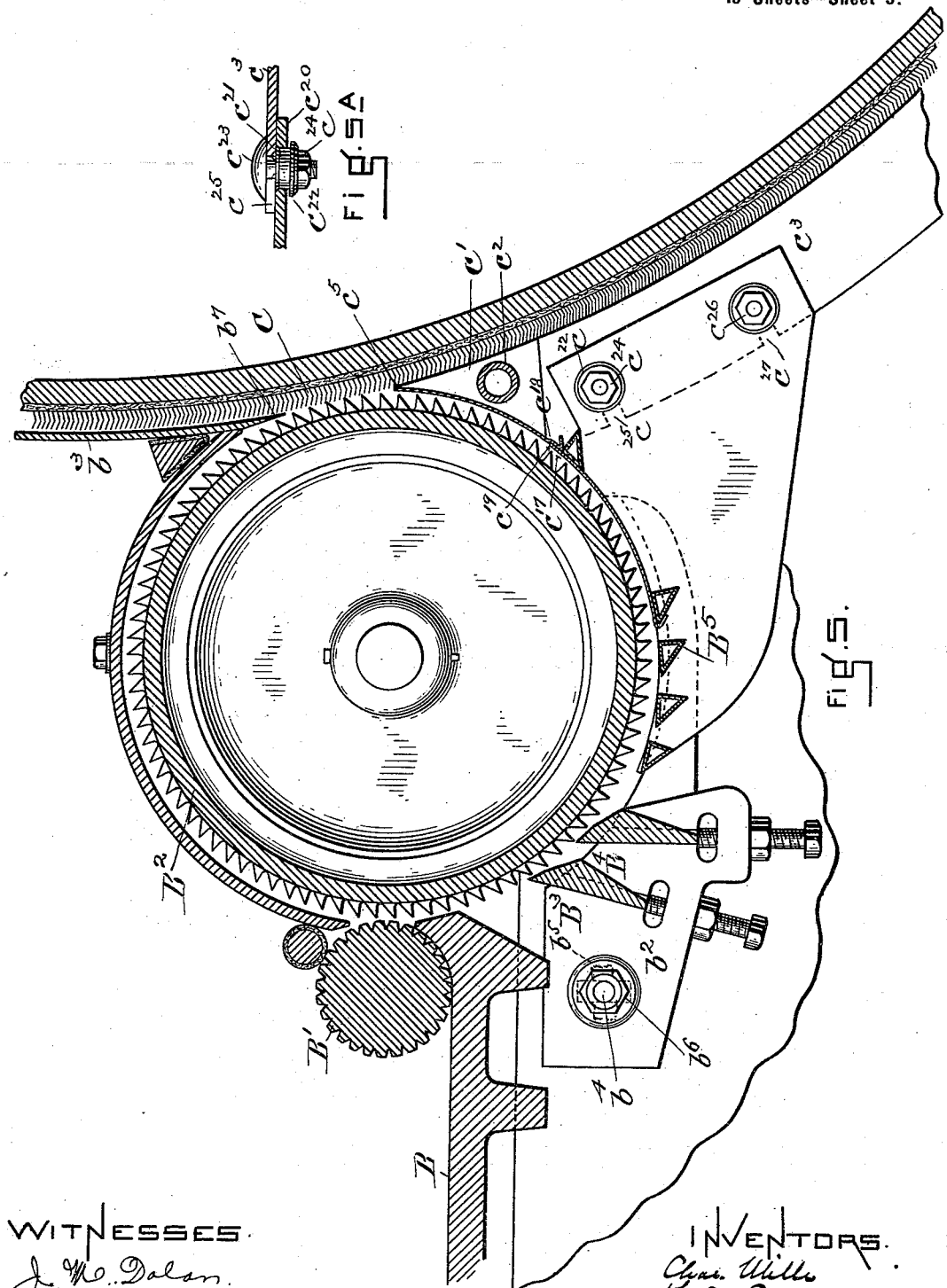
Figure 6:
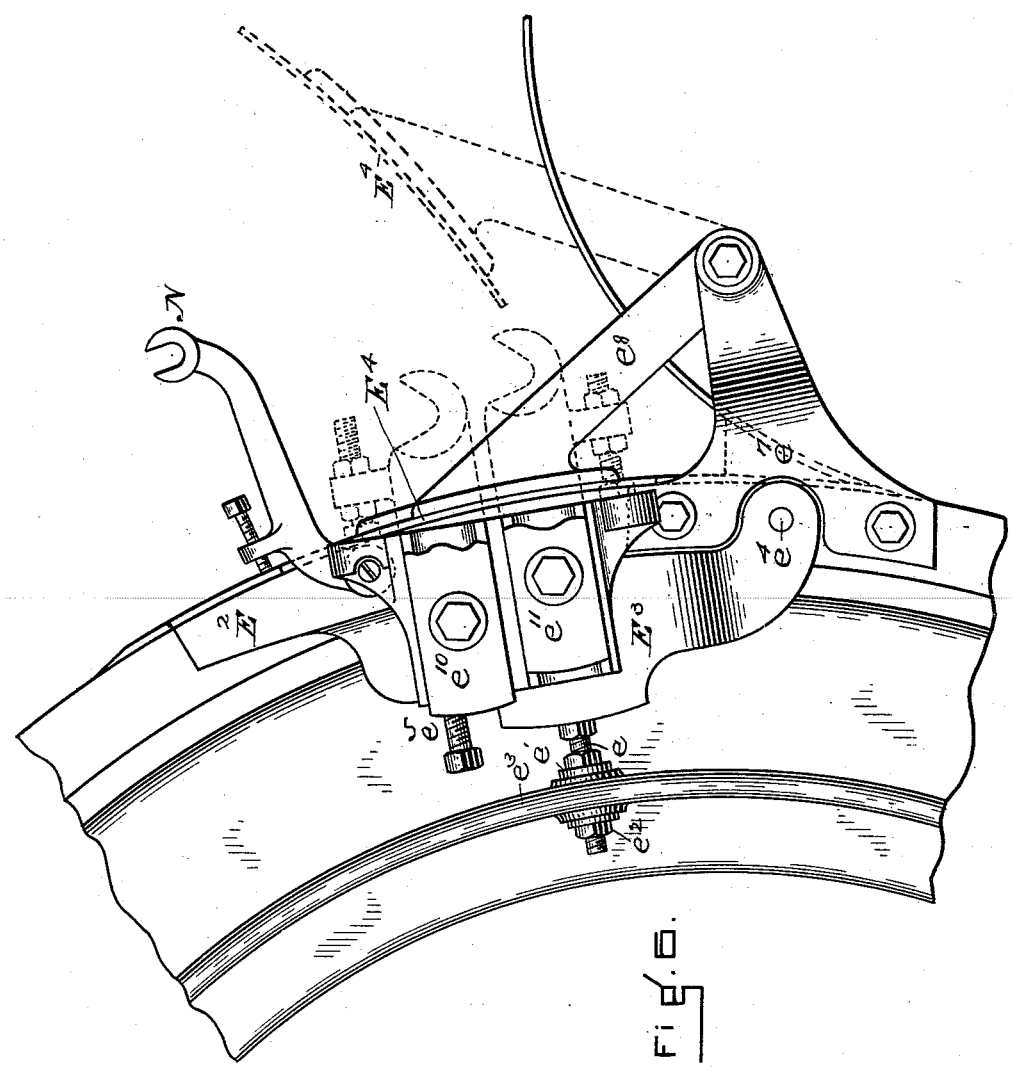
Figure 6:
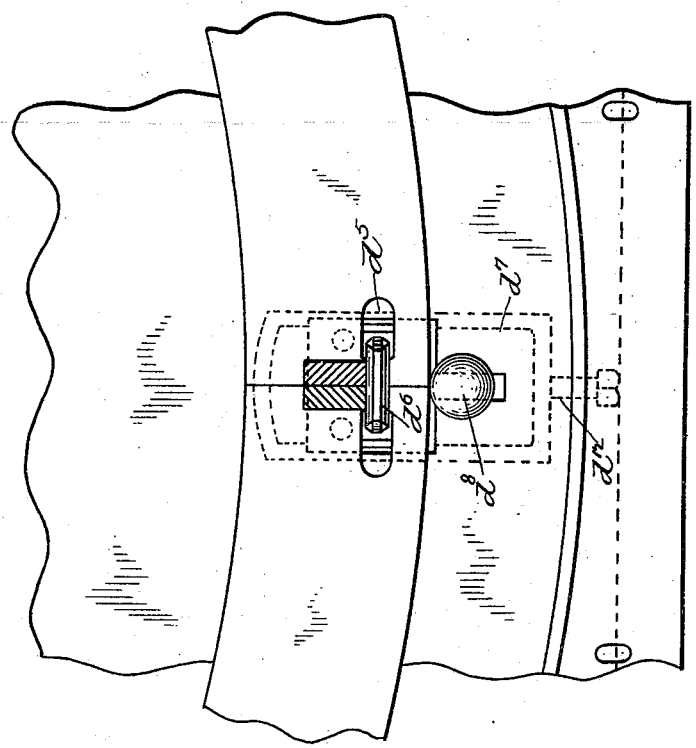
Figure 7:
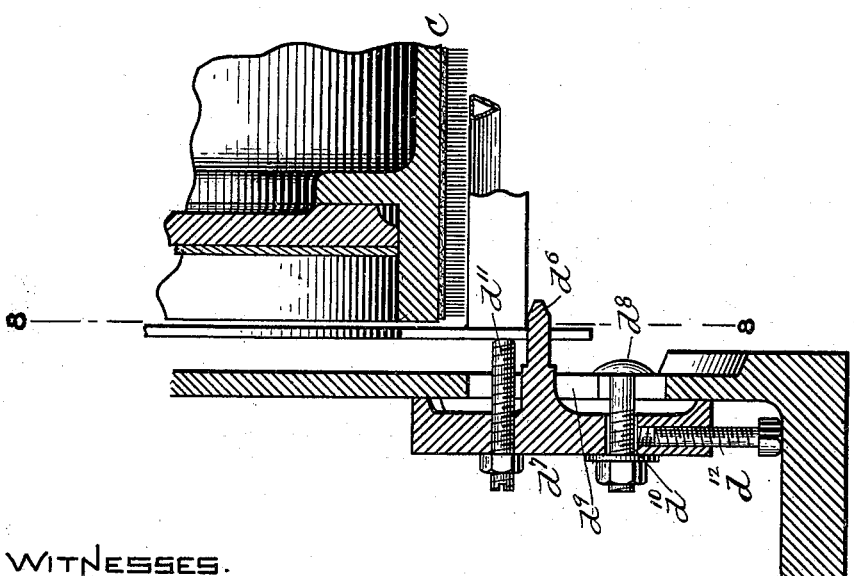
Figure 14:
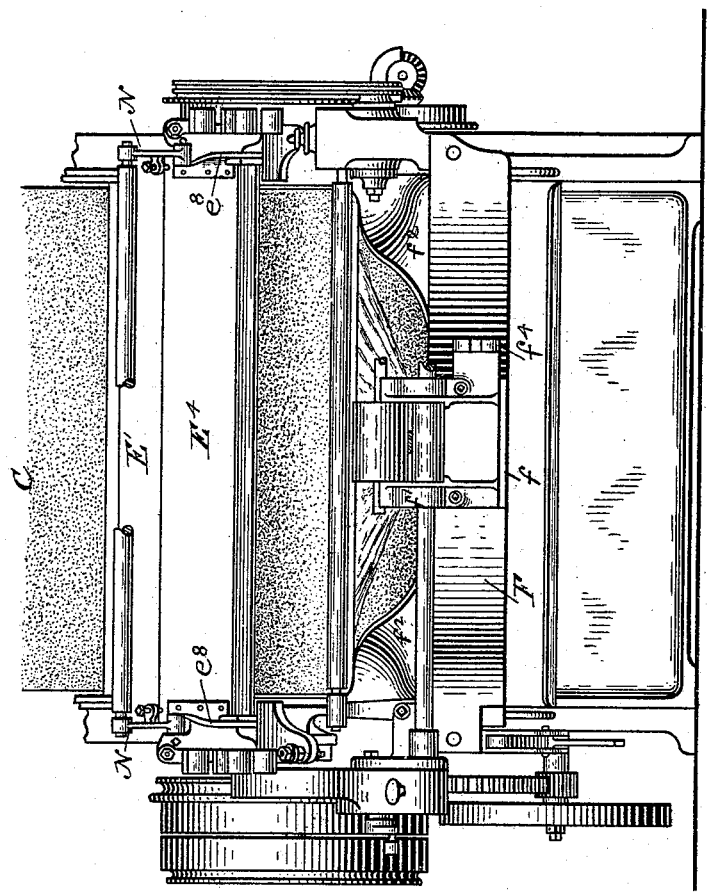
Figure 18:
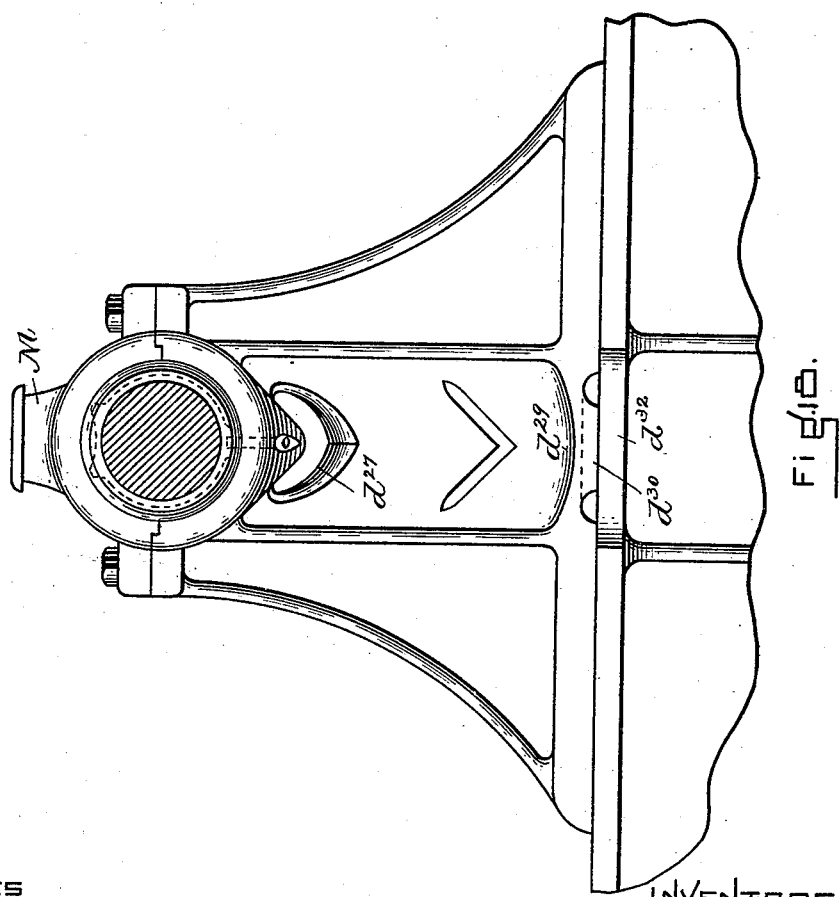
Figure 27:
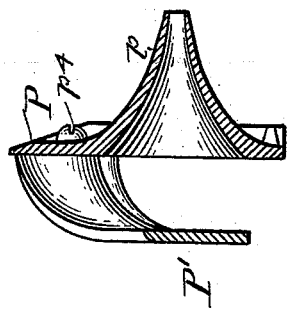
Figure 29:
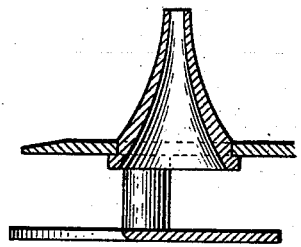
Figure 26:
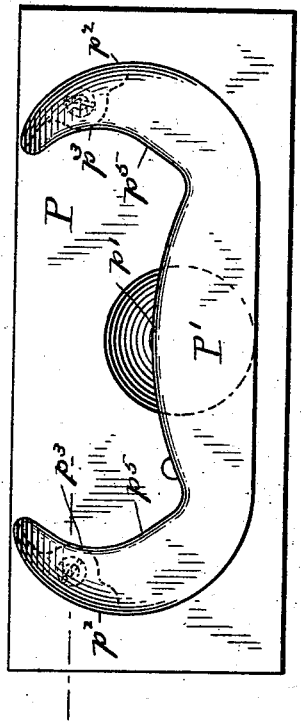
Figure 28:
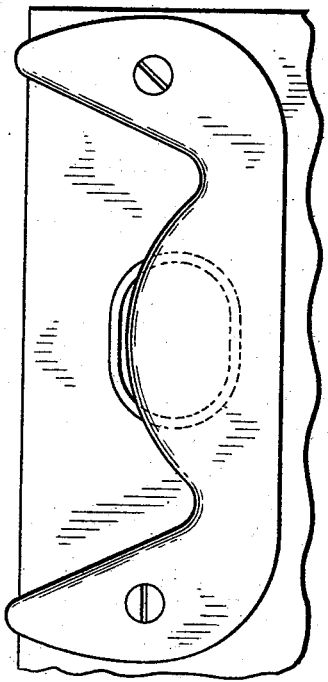
Figure 30:
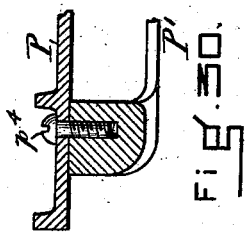

In the drawings, Figure 1 is a view in left side elevation of a carding-engine containing the features of our invention. Fig. 2 is a view in plan of the carding-engine, the parts above the dotted line 2 2 of Fig. 1 being removed. Fig. 3 is a view, enlarged, principally in side elevation, of the devices for adjusting the licker-in roll, the screen adjacent thereto, the mote-knives, make-up pieces, and knife-plate, all in relation to the main cylinder. Fig. 4 is a view, enlarged, in vertical cross-section through one end of the licker-in roll, its actuating-shaft, and bearing for the same. Fig. 5 is a view in vertical section, enlarged, upon the dotted line 5 5 of Fig. 2. Fig. 5ᴬ is a detail view of a part of the licker-in-screen-adjusting mechanism, to which reference is hereinafter made. Fig. 6 is a view in side elevation, enlarged, of devices for adjusting the flat-stripping plate and make-up pieces upon the doffer side of the main cylinder. Fig. 7 is a view, enlarged, in vertical section upon the line 7 7 of Fig. 1; Fig. 8, a view in elevation, looking from the interior of the machine outwardly, of devices for adjusting and connecting the screen of the main carding-cylinder at its lowest part or beneath the center of the main carding-cylinder. Fig. 9 is a detail view, principally in horizontal section, upon the dotted line 9 9 of Fig. 1, illustrating the means for the adjustment of the portion of the main-cylinder screen upon the doffer side. Fig. 10 is a view, enlarged, in vertical section upon the dotted line 10 10 of Fig. 3, showing the device for supporting and adjusting the screen between the licker-in roll and the main cylinder. Fig. 10$^A$ is a view in perspective of an adjusting-piece for making the adjustment referred to in Fig. 10. Fig. 11 is a view, enlarged, in vertical section upon the dotted line 11 11 of Fig. 2, a portion of the main carding-cylinder being removed. Fig. 12 is an enlarged view, principally in front elevation, representing a portion of the mechanism for supporting a movable section of the cylinder-casing at the front of the machine, a portion of one of the slides to which the cover connections and one make-up piece are attached, and a bracket for supporting one end of a cleaning-roll. Fig. 13 is a detail view, enlarged, of the said cleaning-roll bracket or arm. Fig. 14 is a view in elevation of the front of the carding-engine, representing the stand for the calender-rolls, the sliver-coiler stand and can being removed. Fig. 15 is an enlarged detail view in elevation representing especially the mechanism for operating the traveling flats and devices for cleaning their surfaces and their ends. Figs. 16 and 17 are enlarged views representing an oiling device, to which reference is hereinafter made. Fig. 18 is a view, enlarged, in side elevation, and Fig. 19 a view in vertical section, of a box for the main-cylinder shaft. Fig. 20 is a view, enlarged, principally in side elevation, to show portions of the slides, make-up pieces, cylinder-casing, stripping, grinding, and cleaning roll supports, and removable cover hereinafter described. Fig. 20$^A$ is a view, enlarged, in vertical section, through a portion of the cylinder of the carding-engine and of the doffer-cylinder, the forward stripping-plate, cover-plate, and doffer-plate. Fig. 21 is a view in side elevation of an improved form of lap-stand. Fig. 22 is a detail view, enlarged, of a section thereof. Fig. 23 is a view in plan of the calender-roll stand or front girth. Fig. 24 is a detail view, in side elevation, enlarged, of the parts represented in Fig. 15, with the addition of devices for rotating the brush for cleaning the surfaces of the flats; and Fig. 25 is a view in perspective of a portion of the coiler-post, the calender-roll stand, and the front girth. Fig. 26 is a view in rear elevation, enlarged, of a butterfly and tunnel-plate. Fig. 27 is a view in vertical central section through it. Figs. 28 and 29 represent the old or common type of butterfly and manner of connecting it with the trumpet-plate. Fig. 30 is a view in horizontal section upon the dotted line of Fig. 26. Fig. 31 is a sectional detail showing the manner of mounting the make-up pieces and brackets upon the doffer-roll end of the main cylinder, Fig. 32 being a section on line 32 32 of Fig. 31 and Fig. 33 being a section on line 33 33 of Fig. 31. Fig. 34 is a detail showing the manner in which the upper part of the main-cylinder screen and its supporting-tube are connected and braced. Fig. 35 is a section on line 35 35 of Fig. 31.

The lap, in the form of a roll, is held by the lap-stands at the rear of the machine. The lap is fed, acted upon, and reduced to the form of sliver in the manner common to this type of machine. The lap-stands support two brackets of peculiar shape at the rear of the engine. (See Figs. 1, 2, and 21.) These brackets are lettered A, and each is attached to the upper end of a rod $a$. The brackets are shaped to provide two sets of open hangers or bearings out of line with each other, one set being back of the rods $a$ and the other upon a higher level and in front of said rods, and they are adapted to hold the lap rod or shaft of an extra lap and also an additional lap rod or shaft or a grinding or any other roll.

In the drawings the brackets are represented as fastened to the rods $a$ by the set-screws $a'$, and the lower back hangers or bearings are lettered $a^2$ and the upper front ones $a^3$. This arrangement of hangers or bearings is a very convenient one in that it affords means for the disposition of lap and other shafts or rolls in convenient relation to each other and to the engine. The brackets A are also readily removed from and attached to the lap-stand without requiring the release of any fastening-screw or other fastening device, and they are also so connected to the lap-stand that the act of replacing them automatically brings them into proper line with each other. This result is accomplished by providing the lower end of each of the rods $a$ with the incline $a^4$ (see Fig. 22) and by attaching each rod to its respective section of the lap-stand by means of a long receiving-hole $a^5$, (see Fig. 21,) the hole being slightly larger than the rod and the rod being removable therefrom by an upward movement. It has an easy fit in said hole, so that when inserted therein it will find its lowest position by gravity. Below the hole $a^5$, on the outer side of the lap-stand, is a lug or projection $a^6$, the outer edge of which is about in line with the center of the hole $a^5$. This edge acts with the inclined end $a^4$ of the rod to turn the rod, and consequently the hanger, automatically as the rod is moving or falling to its lowest position. If the rod or hanger should be out of position or line in which it should be, the incline will permit the rod and the bracket it supports to make very nearly a quarter of a turn in its downward movement and will to that extent automatically turn the bracket, and as the hangers $a^2$ always occupy the back position there is no difficulty in starting the rods in the holes so that the inclines will automatically turn the brackets, what little they will need to be turned, to bring the hangers into line with each other, and after the rods have so located themselves and the brackets the projections $a^6$ hold or lock them in such position.

The lap passes from the lap-roll over the feed-apron B to the feed-roll B', (see Fig. 5,) which feeds the lap to the licker-in $B^2$. These parts are like those commonly used in this class of machines. The teeth of the licker-in take the lap from the feed-roll and feed-apron, comb it out, carry it forward, and in turn feed it to the teeth or wire of the main carding-cylinder C.

The boxes $B^6$, (see Fig. 3,) which support the ends of the licker-in shaft, are adjustable horizontally upon the card sides by means of adjusting or draw screws $b$. Each box $B^6$ has cast with it a downward-extending apron or flange $b'$, (see Fig. 3,) which supports a hanger or bracket $b^2$, carrying the ends of the licker-in mote-knives $B^3$ $B^4$. (See Fig. 5.) Each box $B^6$ also carries means for adjusting the rear portion $c'$ of the main-carding-cylinder screen. Each box also carries a make-up piece $B^7$, which is adjustable upon the box and which supports the end of the rear or back knife-plate $b^3$. The box is also provided with means by which oil may so escape from the bearings that in no event may it reach the edge of the passing lap or injure the cotton or pass to any of the revolving parts of the licker-in.

We will first describe the manner of attaching the mote-knives to the licker-in box and the way in which they are adjusted. Heretofore while the hangers or brackets supporting these knives have been attached to the licker-in boxes to be movable horizontally therewith they have not been secured to the licker-in boxes in a manner to permit of the universal adjustment of their working edges in relation to the licker-in, and to enable this to be accomplished we have attached each hanger or bracket $b^2$ to its licker-in box by means of a bolt $b^4$, which passes through a horizontal slot $b^5$ in the apron or downhanging part $b'$ of the box and through a vertical slot $b^6$ in the knife hanger or bracket $b^2$. (See Figs. 3 and 5.) This construction upon the release of the locking-nut permits each knife-bracket to be moved horizontally or vertically or to be swung or swiveled to any desired position, so that it becomes possible to change the vertical and horizontal positions of the mote-knives in relation to the licker-in and also the angle of the presentation of their working edges or sections to the surface of the licker-in or to a radial line taken from the center of the licker-in, and after they have been adjusted to the desired extent the nuts are tightened and the knife-brackets are rigidly locked to the licker-in boxes. Each mote-knife is independently adjustable vertically in its holding hanger or bracket.

It is essential that the upper part $c'$ of the main-cylinder screen maintain a constant relation to the surface of the main cylinder and to the licker-in after it has once been set. To accomplish this end, we have attached it to the licker-in boxes $B^6$ and in order that after it has once been properly set it may be adjusted with the licker-in roll without resetting, and we also attach the screen to the said boxes in a manner which permits it to be more easily set when originally or first fitted to the main cylinder and licker-in roll than has heretofore been possible. This is accomplished by providing the screen near the meeting-line of its upper sections with a tube $c^2$, arranged to extend across the screen from one side flange $c^3$ thereof to the other, and to which side flanges it is rigidly attached at its ends. It is also united to the upper sections of the screen at as many points as may be desired by braces $c^{28}$, (see Figs. 5, 10, and 34,) which serve not only to support the tube, but also to stiffen the entire construction of this part of the screen, so that the two plates or sections upon each side of the tube bear a very rigid, firm, and true relation to each other, which is maintained throughout their length, and this construction also acts to constantly maintain the knife-edge $c^5$ of the screen straight and true throughout its length, and it is very desirable for the best operation of the machine that this edge should be so maintained. The tube not only serves to stiffen the construction of this part of the screen and support it, but it also by its open ends provides means whereby the position of the knife-edge $c^5$ and of the screen-sections below it may be adjusted relatively to the licker-in roll and to the surface of the main cylinder, acting in this capacity as a sleeve or bushing for receiving the ends of the studs or pins $c^6$, which enter said holes a limited extent, (see Fig. 10,) the said holes being counterbored to form shoulders against which the ends of the studs or pins seat themselves. (See Fig. 10.) The pins and their supports serve not only to hold the screen, but also to move it laterally or crosswise the machine and also vertically upward or downward, as the case may be, providing it, in fact, with practically universal adjustment with relation to the meeting-point of the licker-in and main cylinder and likewise the knife or upper edge $c^5$ of the screen.

It is necessary that the screen not only have vertical and horizontal movements for the above-named purposes, but a lateral movement as well, for the purpose of establishing the desired relation between the flanges $c^3$ of the screen and the ends of the main cylinder, upon which they project a limited distance, in order that outward draft at the sides of the screen may be checked or prevented.

To provide the screen with a lateral movement, the pins or studs have threaded outer ends $c^7$, which screw in threaded sections $c^8$ of the brackets $c^9$, which support the pins and which are attached to the licker-in boxes to be movable therewith. Check-nuts $c^{10}$ may be used for locking the pins after they have been turned to adjust the lateral position of the screen. Each bracket $c^9$ not only has the hole $c^8$, but a long bearing $c^{11}$ for the main part of the pin, the hole in the bracket being of sufficient length to permit the pin to be moved inwardly and outwardly to laterally adjust the screen. The check-nuts are released and the pins turned in one direction or the other, according as it is desired that the screen be moved. Each bracket is attached to the licker-in-shaft boxes by means of a bolt $c^{12}$, which passes through the vertical slot $c^{13}$ therein, (see Figs. 10 and 10$^A$,) and this slot is so located that the bracket may be moved vertically or horizontally or swung on an arc. To adjust the screen in either of these directions, the bolts are released and the brackets and screen-top moved to the desired position and the bolts then tightened to rigidly lock the brackets to the licker-in-shaft boxes. The vertical adjustment is assisted by means of the adjusting-screw $c^{14}$, which screws through the base of each bracket against the upper flange of the card side. Horizontal adjustment is assisted by means of two set-screws $c^{15}$ $c^{16}$, (see Fig. 3,) which screw into sections of the licker-in-shaft boxes upon each side of the bracket $c^9$ and the heads of which are adapted to be screwed against the sides of the bracket. These screws $c^{14}$ $c^{15}$ $c^{16}$ not only assist in making fine vertical and horizontal adjustments of the brackets and screen, but they also serve after such adjustments have been obtained to lock the brackets and screens in their new position.

The main-cylinder screen supports the licker-in screen B$^5$, which is attached to the side flanges of the main-cylinder screen in a manner to provide it with a greater range of adjustment than it has before had. It is desirable that the upper edge $c^{17}$ of the licker-in screen (see Fig. 5) where it joins the lower edge $c^{18}$ of the main-cylinder screen should bear a continuous relation thereto—that is, the said edge should not in the adjustment of the licker-in screen B$^5$ be separated from the edge $c^{18}$ or be permitted to drop away from it. To obtain this result, we have provided the licker-in screen B$^5$ with an outward and upwardly extending lip or flange $c^{19}$, which laps upon the surface of the section $c^{18}$ of the main screen, the said section upon which this lip or flange extends being slightly depressed. (See Fig. 5.) The licker-in screen is also provided with means for its adjustment which brings its fulcrum-point so closely to this lip that in the movement of the screen the relation of this lip to the lower edge of the main screen is not materially changed. This result is secured by providing each flange $c^{20}$ of the licker-in screen with a bushing $c^{21}$, (see Fig. 5$^A$,) upon which it is free to turn and which is bolted against the side of the cylinder-screen by a bolt having a short square section extending through a slot. The bushing has an enlargement upon the opposite side of the flange of the licker-in screen against which the nut or a washer and nut bear. The head of the bolt is lettered $c^{23}$, the washer $c^{22}$, the nut $c^{24}$, and the slot $c^{25}$. The bushing being thus locked to the flange of the main screen provides a fixed pivot or fulcrum point which may be varied in position by means of the said slot $c^{25}$ in the main-cylinder flange, and in the adjustment of the licker-in screen this fulcrum-point is first determined by the movement of the bolt in the slot $c^{25}$, and when found the bushing is locked to the side flange, as above indicated, leaving the licker-in screen pivoted and free to be further adjusted by the bolt and nut $c^{26}$, which has provision for movement in the slot or recess $c^{27}$ in the main-cylinder flange. (See Fig. 5.) These devices permit the licker-in screen to be moved toward or from the licker-in roll without disturbing or breaking its connection with the main-cylinder screen. It will be noticed that the licker-in screen being attached to the main-cylinder screen is adjustable with it.

The make-up pieces B$^7$ have heretofore been attached to the main-frame arches and independently adjustable thereon. They support the knife-plate $b^3$, which spans the machine above the meeting-point of the licker-in and main cylinder, forming a part of the casing of the main cylinder and the lower edge $b^7$ of which is thin and sharp to permit the plate to approach as nearly as possible to the point where the teeth of the licker-in roll and the teeth of the clothing of the main card-cylinder separate or leave each other. We have attached these make-up pieces B$^7$ to the licker-in-shaft boxes in order that the knife-plate may be made adjustable with the licker-in and screen. Each make-up piece is secured to a bracket $b^8$, (see Fig. 3,) which is integral with the licker-in-shaft box and is secured thereto by the bolts $b^9$ $b^{10}$. The bolt-holes in the bracket $b^8$ are made larger than the bolts to permit of the adjustment of the make-up piece in the setting up of the machine to the cylinder, in order that the knife-plate, which the make-up pieces support, may be set to the position desired. The bracket $b^8$ also has a lug $b^{11}$, extending inwardly, which acts as a foot upon which the make-up piece rests, and it takes the weight thereof from the said fastening-bolts. By thus supporting and connecting the licker-in, mote-knives, licker-in screen, main-cylinder screen, make-up pieces, and knife-plate they may be first independently adjusted in relation to each other to secure a desired setting or relation, and they may then by the adjustment of the boxes of the licker-in shaft be simultaneously moved as one in relation to the main carding-cylinder, thereby dispensing with the necessity of additional or separate adjustment after once they have been set, and thus doing away with the separate readjustment of these parts in relation to each other and to the main carding-cylinder heretofore necessary to adapt them to the changed condition produced by the changing of the diameter of the main cylinder from the wearing or grinding off of its wire clothing.

To prevent oil from the bearings of the licker-in-shaft boxes from reaching the ends of the licker-in or its screen, the oil-chamber D in the shroud, (see Fig. 4,) which receives the oil waste or drip from the bearing, has an outlet formed by inclining backwardly and upwardly or undercutting the under surface $d$ of a teat or projection, which incline or undercut extends to the drip-point $d'$, and oil leaving this oil-chamber D will work down the under surface of this incline to the drip-point and will there drop into a recess or hole $d^2$, formed in the knife-bracket $b'$ of the licker-in-shaft box. The under surface $d^3$ of this recess $d^2$ is inclined from its inner edge downwardly and outwardly, (see Fig. 4,) so that it serves to deflect the oil to the outer side of this holder or pocket, from which it runs down between the outer side of the said bracket $b'$ and the inner side of the card side to the point $d^4$, wholly below the lower point of the licker-in or its screen, and this arrangement of passages and shaping of parts precludes the possibility of oil or waste reaching the end of the licker-in or the licker-in screen.

It will be seen that the entire main-cylinder screen is made in two parts, one of which, the back screen, we have already described. The other section is known as the "front screen," and it extends from the lower edge of the back section forward and upward to a point between the main cylinder and the doffer, the two screen-sections entirely covering the under part of the main carding-cylinder from the licker-in to the doffer. It is desirable to provide this lower section of the screen with vertical adjustment in relation to the surface of the main cylinder, and this is accomplished by forming in the side flanges of the two screen-sections where they come together the long slot $d^5$, (see Fig. 8,) a part being in each flange, and into this slot there extends a wide support or ear $d^6$, which supports the lower ends of both sections, and which being narrower than the slot permits the said sections to be laterally movable thereon, while spanning the ends of both. It is adapted on its vertical movement to provide them with simultaneous vertical adjustment. The ear $d^6$ extends inwardly from the inner surface of a bracket $d^7$ upon the outside of the machine-frame. The bracket is adjustable vertically upon the frame, being attached thereto by the bolt $d^8$, which is inserted through a large opening $d^9$ in the frame and dropped into a downwardly-extending slot therefrom, the bolt passing through a hole $d^{10}$ in the bracket. (See Fig. 7.) The ear extends through the larger hole $d^9$, and there also extends from the bracket through the same hole an adjusting-screw $d^{11}$, by which each screen-section is moved laterally. To adjust the bracket and thereby the screen-sections vertically, there is used an adjusting-screw $d^{12}$, which screws into the lower end of the bracket, its head resting upon the base of the card side. By turning this screw after loosening the holding-bolt the bracket is moved up or down, thereby vertically adjusting the screen ends together. The upper end of the front section of the screen is also adjustable laterally and vertically in relation to the main cylinder and the doffer. We would here say that in the adjustment of the entire screen to the main card-cylinder there is a creep or movement of the screen in a forward direction or toward the front of the main cylinder, and therefore all the connections of the screen, with its adjusting devices, which are remote from the back, must be of a nature to permit this creep or slight movement of the screen toward its forward end, and for this reason the slot $d^5$ is made longer than the ear $d^6$, and in the adjustment of the upper end of the front section of the screen this creep is taken into account by providing the flange of the screen with an inclined slot or a slot parallel with the curve of the flange. (See Figs. 9 and 11.) This slot is lettered $d^{13}$, and into it there extends the end $d^{14}$ of a pin which is adjustable vertically upon the outer surface of the card side. The pin also supports the forward end of the front section. It is fastened to the bracket $d^{15}$ and projects inwardly from it through a hole $d^{16}$ in the card side. The bracket is fastened to the card side by the bolt $d^{17}$ and is horizontally adjustable in relation to the rib $d^{18}$ of the card side by an adjusting-screw $d^{19}$, which screws into the side of the bracket and bears with its head against the rib. The screw $d^{20}$, carried by the bracket, bears against the screen-flange and serves to adjust it laterally.

Figure 19:
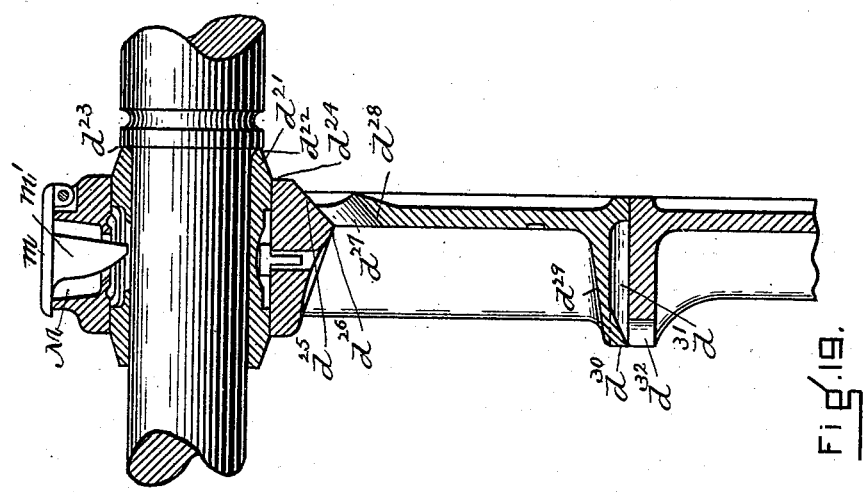
Figure 20:
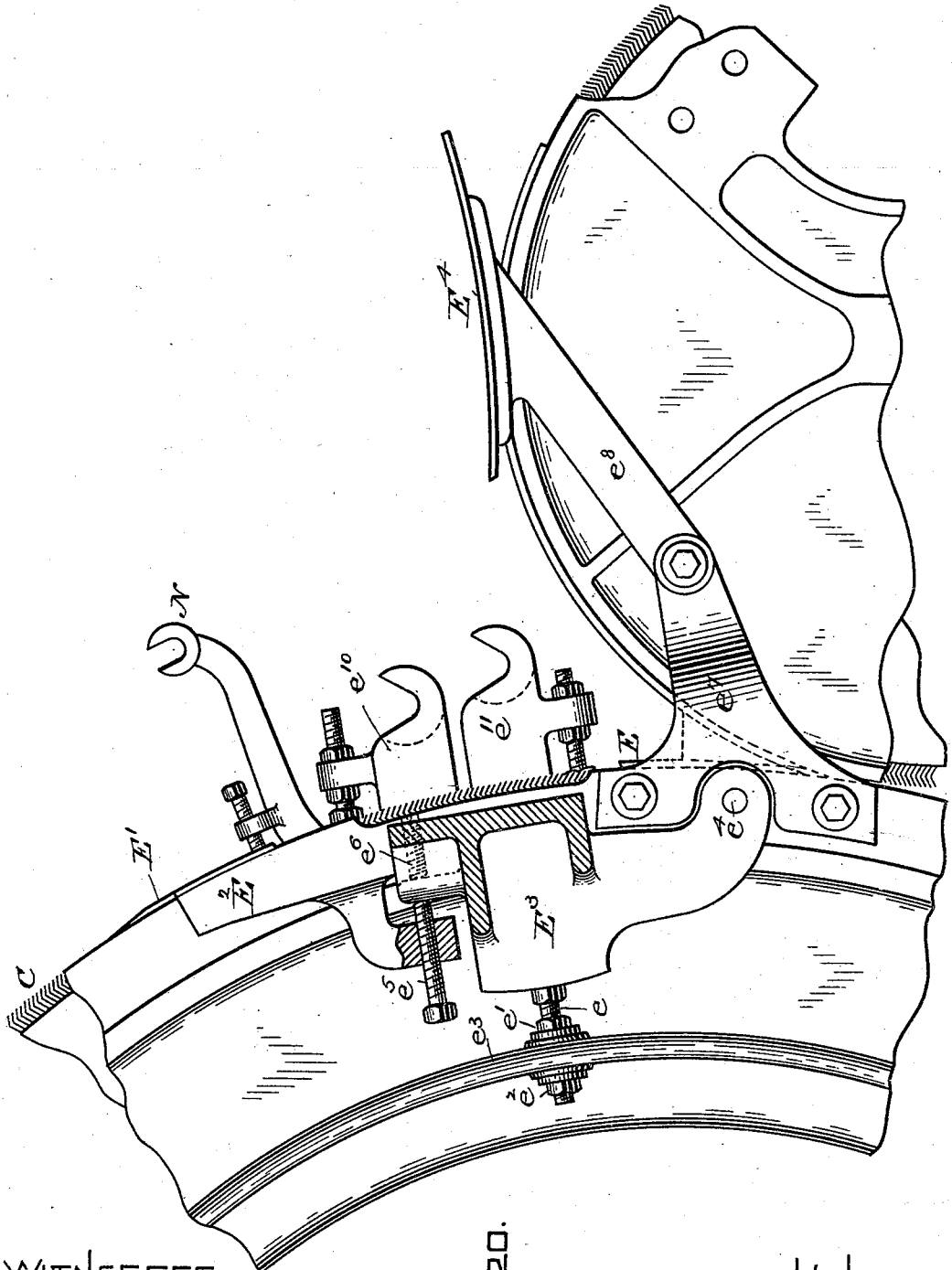

In Figs. 18 and 19 we show means by which oil escaping from the inner side of the main-cylinder-shaft bearing is directed or guided to the outer side of the card-frame and is prevented from working its way to the end of the cylinder or to the cylinder-screen. It comprises the bushing $d^{21}$, which forms the bearing for the shafts, having the incline $d^{22}$, which extends downwardly and outwardly from a shoulder $d^{23}$ on the shaft to the inner side $d^{24}$ of the main box. (See Fig. 19.) From this inner side the main box has a downwardly and outwardly extending incline $d^{25}$, ending in a drip-point $d^{26}$, which is upon the outer side of the bracket or casting which supports the main box, and there is formed in this casting below the incline $d^{25}$ a hole $d^{27}$, having an outwardly-inclined lower surface $d^{28}$. Oil which escapes inwardly from the bearing is by these incline surfaces caused to take an outward course and to finally leave the drip-point $d^{26}$ upon the outer side of the box-bracket, and is thereby precluded from reaching the end of the main carding-cylinder, the screen, or any of the parts adjacent thereto. The main box bracket or support is further provided with means for preventing this waste oil from working into the inside of the card-frame where the bracket rests upon the upper surface thereof by extending outwardly a section $d^{29}$ of the bracket to form a gutter or trough, which ends with an overhanging lip $d^{30}$, the lower side of which is undercut or inclined upwardly and backwardly to form a recess $d^{31}$ between the trough and the top of the card side, and the flange of the card side is cut away at $d^{32}$, so that waste oil running over the trough drops from the lip $d^{30}$, free of the card side, and any tendency to work back under the bracket to the inner side of the card side is prevented.

Between the main carding-cylinder and the doffer there is a plate E, known as the "doffer knife-plate," and between the main cylinder and front section of the traveling flats there is another plate, known as the "stripping knife-plate" E'. Between these knife-plates there is a section of the main-cylinder casing which is removable for the purpose of exposing the cylinder-clothing to the operation of a cylinder-clothing grinding-roll and a stripping-roll. This removable section is in the form of a plate lettered $E^4$, (see Figs. 6, 20, and 20$^A$,) and the manner of supporting it and attaching it to the make-up pieces will be hereinafter described. It is desirable that these plates have independent and collective adjustments, and this is accomplished by mounting the make-up pieces $E^2$ upon the make-up piece stands or brackets $E^3$. (See Figs. 1, 2, and 20.) Each stand is adjustable radially in ways upon the cylinder-arch by means of the adjusting-screw $e$, (see Fig. 20,) which extends from the stands through adjusting-nuts $e'$ $e^2$ upon either side of the rib $e^3$ on the arch and by means of which the screw $e$, and therefore the stand, may be moved in one direction or the other radially, being slotted at $e^{12}$, the set-screw $e^{13}$ passing through said slot into the flange. The make-up pieces are pivoted to their respective stands at $e^4$, and to the outer surface of these pieces, at their upper ends, is attached the knife or stripping plate E', and it is adjusted toward and from the main cylinder by means of the adjusting-screws $e^5$ $e^6$, carried by the make-up pieces and one of which bears against one surface of a rib on the stand $E^3$ and the other against the opposite surface of said rib. By turning these screws the make-up pieces are adjusted upon their pivotal points $e^4$ until the stripping-plate E' has been moved to the desired position, when they further act to lock the plate and the make-up pieces in such position. The make-up pieces also carry brackets $e^7$, extending outwardly therefrom near their lower ends, which brackets support at their outer ends arms $e^8$, to the ends of which the curved cover-plate $E^4$, above referred to, is attached, the brackets and cover-arms being so located and arranged that the plate is removable as a whole from the side of the main cylinder to a position relatively remote therefrom, thereby exposing the entire opening to the operations of grinding and stripping and being removed from interference with the grinding or stripping rolls.

In Fig. 20$^A$ the plate is represented in its closed position and in Fig. 20 as wide open. This plate being connected with the make-up pieces, knife-plate E', and stand $E^3$ is adjustable simultaneously with them by the operation of the adjusting-screw $e$. The doffer knife-plate E is attached to the make-up pieces opposite its pivotal point $e^4$. The stands $E^3$ also support the independent stands or brackets $e^{10}$ $e^{11}$, which are adapted to support, respectively, the grinder-roll and the stripper-roll, and these stands $e^{10}$ $e^{11}$ are independently adjustable in the usual way upon the said stands $E^3$.

By the construction described it will be seen that provision is supplied for the independent adjustment of the stripper-plate E' by the movement of the make-up pieces in relation to the stand $E^3$, and that this adjustment of the stripper-plate also adjusts the cover-plate. After the stripper-plate has been so adjusted it is then adapted to be adjusted with the cover-plate, doffer-plate, grinding-roll stand, and stripping-roll stand simultaneously by the movement of the stands $E^3$ and by the operation of the single adjusting-screws $e$.

Heretofore the front girth of the frame, which acts as a brace and also supports the stand for the calender-rolls, has been made in the form of an angular plate with a wide upper surface. This plate is objectionable for a number of reasons. It has not sufficient strength or rigidity. Its upper surface collected fly. It was used as a shelf for oil-cans, &c. It was in the way, as it prevented ready access to the parts of the machine below. It did not provide means by which the calender-stand could be readily attached and adjusted vertically in order that it might line with the roll-operating shaft, and we have employed in lieu of said girth the girth F, (see Figs. 14, 23, and 25,) which is deep vertically, but not wide horizontally, and is in the form of a truss, the central part being extended or bowing outwardly to the plane vertical surface $f$, to which the calender-roll stand $f'$ is attached. The girth is secured by bolts to the ends of the card sides. The calender-roll stand is vertically adjustable upon the surface $f$ of the girth. At each end of the girth there is a corner-plate $f^2$, which is bolted to the card side and extends along the top of the card side and the upper edge of the girth. The upper edge $f^3$ of this corner-plate extends from its rear downward, first by a slow curve and then more rapidly. The plate is further shaped by being curved inwardly upon its side near its upper end and then curved or rounded outwardly. These corner-plates serve to protect the edges of the web as it passes from the doffer to the calender-rolls, and they also allow fly or any dust or other undesirable matter to drop free from the sliver to a pan below or to the floor.

Heretofore the sliver-coiler stand or post has been attached to the front surface of the old type of girth. By changing the form of the girth it becomes possible to attach the sliver-coiler stand directly to the calender-roll stand, the calender-roll stand being provided with an outwardly-extending side $f^4$, to which the sliver-coiler stand F' is bolted. This construction is advantageous in fitting up the engine in that it requires no adjustment of the shaft operating the calender-roll and the sliver-coiler in relation to the driving-gear of the coiler or to the bracket or stand to which the coiler-stand is secured.

Heretofore the brush-roll G for cleaning the flats (see Fig. 24) has frequently been run by a belt extending from a small pulley on the flat-driving shaft to a pulley on the brush-shaft. This construction has not been satisfactory, because it would not always operate the brush, and it is desirable that the brush should have constant and regular rotation. To provide it with such rotation, we have mounted upon the end of the brush-shaft $g$ a sprocket-wheel $g'$ and upon the end of the driving-shaft $g^2$ a sprocket-wheel $g^3$. These wheels are connected by a sprocket-chain $g^4$, which communicates to the brush-roll G a positive uniform rotation.

Heretofore there has been used in carding-engines two rotary brushes for cleaning the ends of the flats. They have generally been attached one to each arch to work upon the upper surface of the flat ends as they pass by it. We have discovered that such brushes pick up and remove the dirt or dust from the flat ends better if they have in addition to their usual rotating movement a bodily movement toward and from the ends of the flats, and this movement may be extended sufficiently to cause each brush to be brought into contact with the ends of the flats as they pass over it. To give the brushes this additional movement, each brush-shaft $g^5$ is mounted upon an arm extending from the rocking shaft $g^6$, which operates the flat-stripping comb $g^7$. (See Fig. 15.) It will be understood that said rocking shaft is provided with a forward-and-back rotation by means of another arm $g^8$, the end of which bears upon an operating-cam on the flat-driving shaft. The brush-shaft is constantly rotated by a belt in the ordinary way, the rocking shaft simply giving it reciprocating movements in relation to the flat ends passing under the brush, which movement may be increased sufficiently to cause the brush to be brought into contact with the ends of the flats passing over it.

It is frequently necessary to remove the driving-pulley on the shaft operating the flats and the worm on said shaft, and heretofore the oil-cup which supplies the lubricant for said worm has been secured to the stand which bears the shaft in such a way that it has been necessary to remove it in order to remove the worm. It frequently happens that in restoring the part the oil-cup is left off and the machine run without it. To prevent this from happening, we have devised an oil-cup which permits the worm to be removed without removing the cup, and the absence of the cup from the machine prevents the operation of the worm when replaced on the shaft. This is accomplished by providing the oil-cup H with the hanger $h$, having a hole $h'$, through which the shaft-supporting stud $h^2$ extends. This hanger acts as a collar or make-up piece for the worm $h^3$. (See Figs. 16 and 17.) The oil-cup is shaped at its front edge $h^4$ to take the thread $h^5$ of the worm, so that the worm can be removed from the stud by turning upon this edge. It is obvious that if the oil-cup is removed from the shaft there is no make-up piece back of the worm and that if the worm is replaced without the cup it will run off the worm-wheel and cease to operate it. It will also be seen that while the front edge of the oil-cup is so shaped that the worm can be run off its stud by it the threads of the worm extend below this edge into the lubricant when the worm is in the oil-cup.

Each of the oil-cups M of the bearings of the main shaft, licker-in shaft, and doffer-shaft has a cover $m$, which is provided with a downwardly-extending finger $m'$. (See Fig. 4.) Each cover is preferably pivoted at its inner end to the box in a manner to permit it to be turned upwardly from the oil-cup, and upon the closing of the cover the finger $m'$ serves to puncture or form a hole in the grease or lubricant in the cup and box, through which the oil or lubricant may reach the bearing. It will be understood that the grease or lubricant often hardens in the bottom of the cup to such an extent as to render this puncture necessary.

In Figs. 12 and 13 we have shown the brackets N used for supporting the ends of a cleaning-roll which is held against the flats. These brackets have a yielding movement, being held to their work by springs, and our improvement consists in the manner in which the springs are applied and their tension regulated. $n$ is a coiled spring contained in the chamber $n'$ in the hub of the bracket. It surrounds the inner end of the bracket-stud $n^2$. One end $n^3$ of the spring is secured to the bracket-hub and the other to the end of the bracket-stud. The outer end of the stud has means by which it may be turned and also means by which it may be locked in any desired position to its support $n^4$. A set-screw $n^5$ is represented as the means for locking it. By turning the stud the tension upon the spring $n$ may be varied at will, and the stud may then be locked in any desired position.

The sides of the carding-engine are connected below the main cylinder by an arched connecting brace or girth having flanges which abut on the inner surface of the sides and to which they are bolted. This brace is wide and curved from each edge upwardly and forms a very stiff connection. It is represented in Fig. 11, O representing one flange of the brace, $o$ the bolts which attach it to the card side, and $o'$ the curved connecting section.

The operation of the various parts of the engine constituting our invention has been fully given in connection with the description thereof. Any mechanical equivalents for the parts or construction specified may be used without departing from the spirit of our invention.

In lieu of the screen-tube $c^2$ a rod may be employed, and its ends may be bored out to form holes for the reception of the ends of the adjusting studs or pins $c^6$. The oil-cup cover $m$ is so attached to its support and so limited as to the extent of its upward or opening movement that it cannot be moved upward and backward to a position of rest or where the finger secured to it will not act to overbalance it and close it.

Heretofore the sliver in passing from the doffer to the tunnel back of the calender-rolls was collected or drawn together by a plate called a "butterfly," which had an upwardly-rounded central section and a horn extending upon each side upward in the same plane with the central section. (See Figs. 28 and 29.) This device has not always acted to close in the sliver without breaking it, the sliver sometimes rising over the edge of the horns and being split or broken by them and the horns and butterfly-attaching devices also affording lodgment for fly or lint, which would work in with the sliver and make irregular work or bunches. This defective working of the butterfly-plate has been overcome by causing the horns to be turned inward toward the trumpet-plate, preferably upon an upwardly-rounding curve, the horns preferably being attached to the butterfly-plate by screws passing through the plate into the horns. This method of fastening enables us to do away with the bolts and bushings heretofore used in securing the old type of butterfly, upon which fly and lint collected. In the drawings, Figs. 26 and 27, P represents the trumpet-plate; P', the butterfly; $p$, the trumpet; $p'$, the upper edge of the butterfly, over which the sliver runs; $p^2$, the horns, which are curved upwardly and inwardly toward or to the trumpet-plate and preferably inwardly turned near their upper ends at $p^3$. These horns preferably form the means by which the butterfly is attached to the trumpet-plate, the horns being made of sufficient thickness at their ends to receive fastening-screws $p^4$, passing through holes formed in the trumpet-plate. The inner edge $p^5$ of the horns preferably is also somewhat tapered or inclined inwardly or toward the trumpet-plate.

Having thus fully described our invention, we claim and desire to secure by Letters Patent of the United States—

1. In a carding-engine, the combination with lap-stands having holes or sockets therein, of rods or supports removably mounted in said holes or sockets, open hangers or roll-supports adjustably mounted on said rods, and means for automatically bringing said rods and hangers to predetermined positions when the rods are placed in the holes or sockets in the lap-stands.

2. In a carding-engine, the combination with lap-stands having holes or sockets therein, of rods adapted to enter and be held in said holes or sockets, means for automatically bringing said rods to predetermined positions immediately said rods reach their seats in the sockets, and hangers or roll-supports adjustably mounted on said rods.

3. In a carding-engine, a hanger, its supporting-rod, means for holding the supporting-rod with the hanger in operative position and to turn or guide the rod and hanger to said operative position as the rod is moved in relation thereto.

4. In a carding-engine, the combination of the lap-stands provided with holes $a^5$ and lugs $a^6$, with the rods $a$ having the inclines $a^4$ and a support A attached to each rod and having one or more hangers.

5. In a carding-engine, the combination with lap-stands having holes or sockets therein, of rods $a$ adapted to be inserted in said holes or sockets, supports or hangers carried by said rods, and means engaging the lower ends of the rods $a$ to support and position them within the holes.

6. In a carding-engine, the combination with lap-stands having holes or sockets, rods adapted to enter said holes, supports or hangers carried by said rods, and means whereby said rods are automatically turned to bring the hangers into proper alinement and register with one another when the rods are inserted in the said holes or sockets.

7. In a carding-engine, the combination with the licker-in, of the licker-in boxes, supporting-brackets pivotally mounted on said licker-in boxes, mote-knives carried by said brackets, and means for securing both vertical and horizontal adjustments of said mote-knife-supporting brackets; whereby the position of said brackets may be changed both vertically and horizontally and the angular position of the mote-knives relative to the licker-in may also be varied.

8. In a carding-engine, the combination with the licker-in, of licker-in-supporting boxes having horizontal slots, mote-knife-supporting brackets provided with vertical slots and mounted on said licker-in boxes, mote-knives carried by said brackets, pivot-bolts passing through said slots and supporting said brackets; whereby said brackets may be adjusted vertically and horizontally and swing on said pivot-bolts to vary the angular position of the mote-knives, relative to the licker-in.

9. In a carding-engine, the licker-in boxes, the make-up pieces B⁷ attached to said boxes and means for adjusting them upon said boxes.

10. In a carding-engine, the combination of the licker-in, the movable licker-in boxes, the make-up pieces attached thereto to be movable therewith and means for adjusting said pieces with relation thereto, the main carding-cylinder and the knife-plate $b^3$ carried by the make-up pieces, as set forth.

11. In a carding-engine, the combination of the licker-in, the licker-in boxes, the make-up pieces carried by said boxes and adjustable in relation thereto, means for adjusting the make-up pieces upon said boxes, and means for simultaneously moving the licker-in, licker-in boxes and make-up pieces in relation to the carding-cylinder, as set forth.

12. The combination in a carding-engine, of the carding-cylinder, the licker-in and licker-in boxes, the knife-plate $b^3$ connected to said licker-in boxes and adjustable with relation thereto and means for simultaneously moving the licker-in and knife-plate in relation to the carding-cylinder, as set forth.

13. The combination of the licker-in boxes having a forward extension forming a lug $b^{11}$ and the make-up pieces $B^7$ resting upon said lug and adjustably secured to said licker-in boxes, substantially as and for the purposes set forth.

14. In a carding-engine, the combination with a main carding-cylinder, of licker-in boxes, a main cylinder-screen mounted on said boxes, and means for adjusting said screen laterally with respect to the main cylinder.

15. In a carding-engine, the combination with a main carding-cylinder, of licker-in boxes on the engine-frame, means for adjusting said boxes relative to the main cylinder, cylinder-screens mounted on said licker-in boxes, and means for adjusting said screens laterally with respect to said main cylinder.

16. In a carding-engine, the combination with a main carding-cylinder, of licker-in boxes, means for adjusting said boxes toward and from said cylinder, cylinder-screens mounted on said boxes, and means for adjusting said screens laterally and horizontally relative to said main cylinder independently of said boxes.

17. In a carding-engine, the combination with a main carding-cylinder, of licker-in boxes adjustable relative to said main cylinder, main-cylinder screens mounted on said boxes and adjustable therewith, and means by which independent vertical, horizontal and lateral adjustments may be given said cylinder-screens.

18. In a carding-engine, the combination with a main cylinder, of licker-in boxes adjustable relative to said main cylinder, and cylinder-screens carried by and so connected with said licker-in boxes as to have independent vertical and horizontal movements thereon and means whereby said screen may be adjusted laterally relative to said main cylinder and swung on an arc to vary the angle of its knife-edge relative to the circumference of the main carding-cylinder.

19. In a carding-engine, the combination with a main carding-cylinder, of licker-in boxes mounted in proximity to said carding-cylinder, a licker-in mounted on said boxes, pivot-bolts carried by said boxes, and cylinder-screens mounted on said pivot-bolts; whereby said screens may be swung in the arc of a circle and the knife-edge carried by said screens may be finely adjusted relative to the licker-in and said screens may be given a lateral adjustment independent of said licker-in boxes with respect to the main cylinder.

20. In a carding-engine, the main-cylinder screen, the section $c'$ of which is provided with side flanges and vertical braces $c^{28}$ lying between and connecting its opposite sides and the supporting-tube $c^2$ suitably mounted and extending from side flange to side flange horizontally through said braces, as and for the purposes set forth.

21. In a carding-engine, the main-cylinder screen having a return section lying under a portion of the licker-in located between the main cylinder and the licker-in in combination with said main cylinder, said licker-in and studs $c^6$ carried in suitable supports and located just below the angle formed by said return section and the main section of said screen, the inner ends of said studs entering the holes in the sides of said screen, as set forth.

22. In a carding-engine, the combination of the carding-cylinder screen, the studs $c^6$ engaging the same and mounted in suitable holders, said studs having threaded sections $c^7$ to engage with threaded sections of said holders, means for turning said studs from without the said holders, and fastening them in desired position, as set forth.

23. In a carding-engine, the combination of the carding-cylinder, screen, the studs $c^6$ to engage the same, a bracket or block $c^9$ in which said studs are laterally adjustable, and means for adjusting said block or bracket horizontally.

24. In a carding-engine, the combination of the carding-cylinder screen, the studs $c^6$ to engage the same, the bracket or block $c^9$ in which said studs are laterally adjustable, and means for adjusting said block or bracket vertically.

25. In a carding-engine, the combination of the carding-cylinder screen, the studs $c^6$ to engage the same, the bracket or block $c^9$ in which said studs are horizontally adjustable, and means for adjusting said block or bracket horizontally and vertically.

26. The combination of the main-cylinder screen, its studs $c^6$ having threaded sections $c^7$, the blocks or brackets $c^9$ having the holes $c^{11}$ and threaded sections $c^8$, the adjusting and holding screws $c^{14}$, $c^{15}$, $c^{16}$ and the locking-screw $c^{12}$ extending through a slot $c^{13}$ in said bracket $c^9$ as and for the purposes described.

27. In a carding-engine, the combination with the main carding-cylinder, of a licker-in, licker-in boxes mounted on the engine-frame, a cylinder-screen carried by said licker-in boxes and adjustable thereon, make-up pieces mounted on said licker-in boxes, a knife-plate carried by said make-up pieces, means for adjusting said make-up pieces on said licker-in boxes relative to the main-cylinder screen, and means for simultaneously adjusting the licker-in boxes and the parts carried by them relative to the main cylinder.

28. The combination of the make-up pieces carrying the knife-plate $b^3$, the main-cylinder screen, means for adjusting said make-up pieces with relation to said screen, the main cylinder and means for simultaneously moving said parts in relation to said main cylinder.

29. The combination of the carding-cylinder screen having slots $c^{25}$ in its flanges, bushings $c^{21}$, headed bolts $c^{23}$ securing said bushings in place in said flanges, and washers $c^{22}$ and the licker-in screen having holes to receive said bushings, as and for the purposes set forth.

30. In a carding-engine, a carding-cylinder screen having the section $c^{18}$ in combination with a licker-in screen having the lip $c^{19}$ adapted to overlap said section $c^{18}$ and form a tight joint therewith, as and for the purposes set forth.

31. The combination of the carding-cylinder screen having the section $c^{18}$ and the adjustable licker-in screen having a lip $c^{19}$ to extend upon said section $c^{18}$, said screens being pivoted together in close proximity to said lip whereby the adjustment of one screen upon the other about said pivot will not appreciably affect the relation between the overlapping surfaces of said screens, as set forth.

32. In a carding-engine, the combination with the main carding-cylinder, of the licker-in, one or more mote-knives, make-up pieces, a knife-plate, a main-cylinder screen, and a licker-in screen, all independently adjustable on their supports, and common supports adjustable relative to the main cylinder to which said parts are secured and with which they are horizontally adjustable; whereby an independent adjustment may be given to each of said parts relative to the carding-cylinder, and they may also be adjusted as a whole toward and from the carding-cylinder.

33. The combination in a carding-engine, of the licker-in boxes having the downward extension $b'$, the mote-knife brackets adjustably secured thereto, the brackets $b^8$ extending forward from said licker-in boxes, the make-up pieces $B^7$ and screen-supporting blocks $c^9$ mounted thereon, and means for simultaneously adjusting said parts relative to the main cylinder, all substantially as described.

34. The licker-in-box bearing above described, consisting of the oil-chamber D located on its inner side and having an outlet $d$, said licker-in box also being provided with a section $b'$ having a hole $d^2$ over which is located a drip-point $d'$ undercut as described, in combination with the side of the card whereby a channel is formed between said section and the card side, as and for the purposes set forth.

35. The combination of the front main-cylinder screen having the slots $d^{13}$ in its flanges with the adjusting-blocks having pins $d^{14}$ which project into said slots, their fastening-bolts $d^{17}$ which extend through holes $d^{16}$ in the card sides, the adjusting-screws $d^{20}$ carried by said blocks and the adjusting and holding screws $d^{19}$ screwing into the blocks and bearing against the ribs $d^{18}$, all as and for the purposes described.

36. In a carding-engine, the combination with the main frame or card sides having ribs formed thereon, of blocks $d^{15}$ secured to the card sides in proximity to said ribs, means for adjusting said blocks relative to said ribs, inwardly-projecting pins carried by said blocks and passing through slots in the card sides, a carding-cylinder screen provided with slotted flanges for the reception of said inwardly-projecting pins, and means carried by said blocks to limit and adjust the lateral movements of the screen.

37. In a carding-engine, the combination with the main frame or card sides having ribs formed thereon, of blocks $d^{15}$ secured to the card sides in proximity to said ribs and adjustable relative thereto, inwardly-projecting pins carried by said blocks and passing through slots in the card sides, a carding-cylinder screen provided with slotted flanges for the reception of the said inwardly-projecting pins so that the front section of said screen may be adjusted horizontally, and adjustable pins carried by said blocks which impinge against the flanges of the screen and provide means for adjusting it laterally.

38. In a carding-engine, in combination with the main-cylinder arch, the make-up pieces $E^2$ pivotally connected thereto at or near their lower ends and means for adjusting them with relation thereto, as set forth.

39. In a carding-engine, the combination of the make-up pieces $E^2$ pivoted near their lower ends with the knife-plate E carried by said make-up pieces, as set forth.

40. The combination in a carding-engine, of the main-cylinder arch, the make-up pieces $E^2$ pivotally connected thereto near their lower ends and carrying the doffer-knife plate E.

41. In a carding-engine, the main-cylinder arch having make-up pieces pivotally connected thereto near their lower ends and carrying the stripper-knife plate E in combination with the cover-plate $E^4$ also attached thereto, as set forth.

42. The combination in a carding-engine, of the stands $E^3$, and make-up pieces $E^2$, said stands and make-up pieces being pivotally connected, as and for the purposes described.

43. The combination in a carding-engine, of the movable stands $E^3$, and the make-up pieces $E^2$ connected thereto and adapted to be moved therewith and carrying the knife-plate $E'$, as set forth.

44. The combination in a carding-engine, of the stands $E^3$, the make-up pieces $E^2$ pivotally connected thereto and the swinging cover $E^4$ carried by said make-up pieces and movable therewith, as set forth.

45. The combination in a carding-engine, of the stands $E^3$, the make-up pieces $E^2$ connected therewith and carrying the doffer-knife plate E, as and for the purposes set forth.

46. The combination in a carding-engine, of the stands $E^3$ and the make-up pieces $E^2$ pivotally connected, said make-up pieces carrying the knife-plate $E'$ whereby said knife-plate $E'$ may be adjusted with relation to said stands $E^3$, as set forth.

47. In a carding-engine, the combination with the stands $E^3$ of the make-up pieces $E^2$, the cover-plate $E^4$ connected to said make-up pieces, and means for adjusting said make-up pieces and stands relative to each other.

48. The combination of the stands $E^3$, the make-up pieces $E^2$ adjustably connected therewith and carrying the doffer-plate E, as set forth.

49. In a carding-engine, the combination with the stands $E^3$, of means for adjusting their positions on the cylinder-arches, the knife-plate $E'$, cover-plate $E^4$ and doffer-plate E connected to said stands, means for adjusting them with relation thereto, and means for simultaneously adjusting them therewith.

50. The combination of the stands $E^3$, the roll-supports $e^{10}$, $e^{11}$ independently adjustable thereon and the independently-adjustable knife-plate $E'$ and cover $E^4$ connected to and adjustable with said stands, as and for the purposes set forth.

51. The combination, in a carding-engine, of the stands $E^3$, the make-up pieces $E^2$, said stands and make-up pieces being pivotally connected to each other and means for adjusting the make-up pieces with relation to said stands, and about the pivotal connections afforded by said pivots, as and for the purposes set forth.

52. The combination of the carding-cylinder, its casing, the make-up pieces, the brackets $e^7$ extending from the make-up pieces, the cover-plate $E^4$ and its arms $e^8$ connected with the outer ends of the brackets.

53. The combination, in a carding-cylinder, of the main-cylinder shaft having a shoulder, its bushing $d^{21}$, the inner end of which abuts against the shoulder upon the shaft, and having an inclined surface $d^{22}$, the main box having the inclined surface $d^{25}$ and drip-point $d^{26}$, the box bracket or support having the holes $d^{27}$ with the inclined bottom $d^{28}$ as and for the purposes described.

54. In a carding-engine, the main-shaft-supporting brackets having the incline surface $d^{29}$, the drip-point $d^{30}$ and the recesses $d^{31}$, $d^{32}$, said drip-point being arranged over the recess $d^{32}$ on the card side, as and for the purposes set forth.

55. In a carding-engine, the combination of the card sides and the girth F made narrow in plan and wide in elevation and extending outward and having a flat section at the center of its length and having corner-pieces $f^2$ formed integral therewith curved as shown and adapted to serve both to strengthen the girth and also to protect the web and allow the dust therefrom to drop below, as set forth.

56. In a carding-engine, the combination of the girth F, the calender-roll stands attached to the front thereof, having a bracket or extension $f^4$ and a coiler-post $F'$ secured to the said bracket.

57. The combination, in a carding-engine, of the girth F, the calender-roll stand $f'$, the coiler-post $F'$, the calender-roll stand connecting the coiler-post with the girth as and for the purposes described.

58. The combination in a carding-engine, the girth F, the calender-roll stand $f'$, attached thereto as described, and the coiler-post $F'$ connected with said calender-roll stand, all as and for the purpose set forth.

59. In a carding-engine, in combination with the flats, of a rocker-arm, flat and cleaning brushes having a rotary movement mounted on said rocker-arm, and means for giving a rocking movement toward and from said flat ends.

60. In a carding-engine, the combination with the traveling flats, of rocker-arms mounted in proximity to said flats, rotary cleaning-brushes carried by said rocker-arms and arranged between said flats, and means for imparting a rocking movement to said arms to cause said brushes to contact alternately with the flat ends above and below said brushes.

61. In a carding-engine, in combination with the traveling flats, a rocking lever carrying at one end an end-cleaning brush and at the other a comb and means whereby said rocking lever is oscillated and said brush is rotated as and for the purposes set forth.

62. In combination, the stud $h^2$, the worm-wheel $h^3$ carried thereby and the oil-cup having a collar or distance-piece $h$, said stud being mounted upon a suitable bracket and said collar or distance-piece being located between said bracket and said worm and serving to maintain the distance between said worm and said bracket, and also to hold said oil-cup under said worm, as and for the purpose set forth.

63. In combination, a stud $h^2$ carrying a worm-wheel $h^3$ and a collar $h$ located thereon next to said worm-wheel and carrying below it an oil-cup, one end $h^4$ of said oil-cup extending part way around the shaft of said worm and provided with a threaded edge whereby said oil-cup may be screwed off from said worm, as and for the purposes set forth.

64. The combination of the oil-cup M, its cover $m$ hinged thereto, a stop to limit the opening of said cover and a finger $m'$ extending from the under surface thereof adapted to overbalance said cover and also to perforate the contents of said oil-cup, whereby said oil-cup is both self-closing and self-cleaning, as and for the purposes set forth.

65. In a carding-engine, a trumpet-plate carrying a trumpet, and a butterfly located in rear of said trumpet and having two horns $p^2$ one at each end, said horns being curved on their opposing sides as shown to form a passage for the sliver and being curved in on its upper side whereby the edges of the sliver will be confined on their sides and on top and directed to the trumpet, as set forth.

66. In a carding-engine, a trumpet-plate carrying a trumpet and having attached to its rear side above the trumpet a butterfly having two horns $p^2$ one at each end, said horns forming points of attachment with said trumpet-plate and being curved on their opposing sides as shown to present a curved surface to the sides of the sliver, as and for the purposes set forth.

67. In a carding-engine, of the character specified, a butterfly having a vertical central section with a curved upper edge and two horns extending upwardly and curved inwardly and forwardly on their opposing surfaces as shown, whereby there is formed a passage surrounding the sliver on three sides and confining the edges of its sliver on their upper side, as set forth.

CHARLES MILLS.
LOREN W. PENNEY.

Witnesses:
F. F. RAYMOND, 2d,
J. M. DOLAN.